(12) United States Patent
Cho et al.

(10) Patent No.: US 9,047,232 B2
(45) Date of Patent: Jun. 2, 2015

(54) STORAGE APPARATUS AND CONTROLLING METHOD FOR DATA TRANSMISSION BASED ON CONTROL INFORMATION

(75) Inventors: Emi Cho, Kawasaki (JP); Yuji Hanaoka, Kawasaki (JP); Atsushi Uchida, Kawasaki (JP); Yoko Kawano, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 603 days.

(21) Appl. No.: 13/227,772

(22) Filed: Sep. 8, 2011

(65) Prior Publication Data

US 2012/0072684 A1    Mar. 22, 2012

(30) Foreign Application Priority Data

Sep. 17, 2010    (JP) ................................ 2010-209389

(51) Int. Cl.
| | |
|---|---|
| *G06F 12/16* | (2006.01) |
| *G06F 11/14* | (2006.01) |
| *G06F 12/08* | (2006.01) |
| *G06F 11/20* | (2006.01) |

(52) U.S. Cl.
CPC ........ *G06F 11/1441* (2013.01); *G06F 12/0868* (2013.01); *G06F 12/0866* (2013.01); *G06F 2212/222* (2013.01); *G06F 11/2015* (2013.01); *G06F 11/2089* (2013.01)

(58) Field of Classification Search
CPC . G06F 3/0619; G06F 3/0646; G06F 3/06647; G06F 3/0689; G06F 3/0674; G06F 3/0675; G06F 3/0676; G06F 3/0679; G06F 3/0688; G06F 11/1441; G06F 11/2015; G06F 12/0866; G06F 12/0868; G06F 12/0804; G06F 12/0871; G06F 12/0873; G06F 2212/2228

See application file for complete search history.

(56) References Cited

U.S. PATENT DOCUMENTS

| | | | | |
|---|---|---|---|---|
| 4,419,725 | A * | 12/1983 | George et al. ................ | 711/206 |
| 4,792,917 | A * | 12/1988 | Takamatsu et al. ... | 711/E12.019 |
| 5,535,399 | A * | 7/1996 | Blitz et al. .................... | 711/144 |
| 8,386,717 | B1 * | 2/2013 | Banerjee et al. .............. | 711/136 |
| 2004/0205296 | A1 * | 10/2004 | Bearden ........................ | 711/129 |
| 2005/0185472 | A1 * | 8/2005 | Randell et al. ........... | 365/185.33 |
| 2005/0210323 | A1 * | 9/2005 | Batchelor et al. .............. | 714/14 |
| 2006/0184736 | A1 * | 8/2006 | Benhase et al. ............... | 711/118 |
| 2008/0189484 | A1 | 8/2008 | Iida et al. | |
| 2008/0276040 | A1 | 11/2008 | Moritoki | |
| 2009/0198931 | A1 * | 8/2009 | Ohyama et al. ............... | 711/162 |

(Continued)

FOREIGN PATENT DOCUMENTS

| | | |
|---|---|---|
| JP | 6-309234 | 11/1994 |
| JP | 9-330277 | 12/1997 |

(Continued)

*Primary Examiner* — Michael Krofcheck

(74) *Attorney, Agent, or Firm* — Staas & Halsey LLP

(57) ABSTRACT

A storage apparatus includes a storage medium configured to store data and a control unit configured to control access to the storage medium. The control unit includes first storage configured to store data to be stored in the storage medium, a second storage configured to store data, a control information generator configured to generate control information indicating a storage state of the data in the first storage and a transfer controller configured to control transfer of the data stored in the first storage to the second storage on the basis of the control information generated by the control information generator when the supply of power to the control unit is stopped.

1 Claim, 14 Drawing Sheets

(56) References Cited

U.S. PATENT DOCUMENTS

2009/0249318 A1* 10/2009 Ayguade et al. .............. 711/118
2010/0332739 A1* 12/2010 Haneda et al. ................ 711/103
2011/0138221 A1*  6/2011 Hanaoka et al. .............. 714/6.1

FOREIGN PATENT DOCUMENTS

| | | |
|---|---|---|
| JP | 2008-192028 | 8/2008 |
| JP | 2008-276646 | 11/2008 |

* cited by examiner

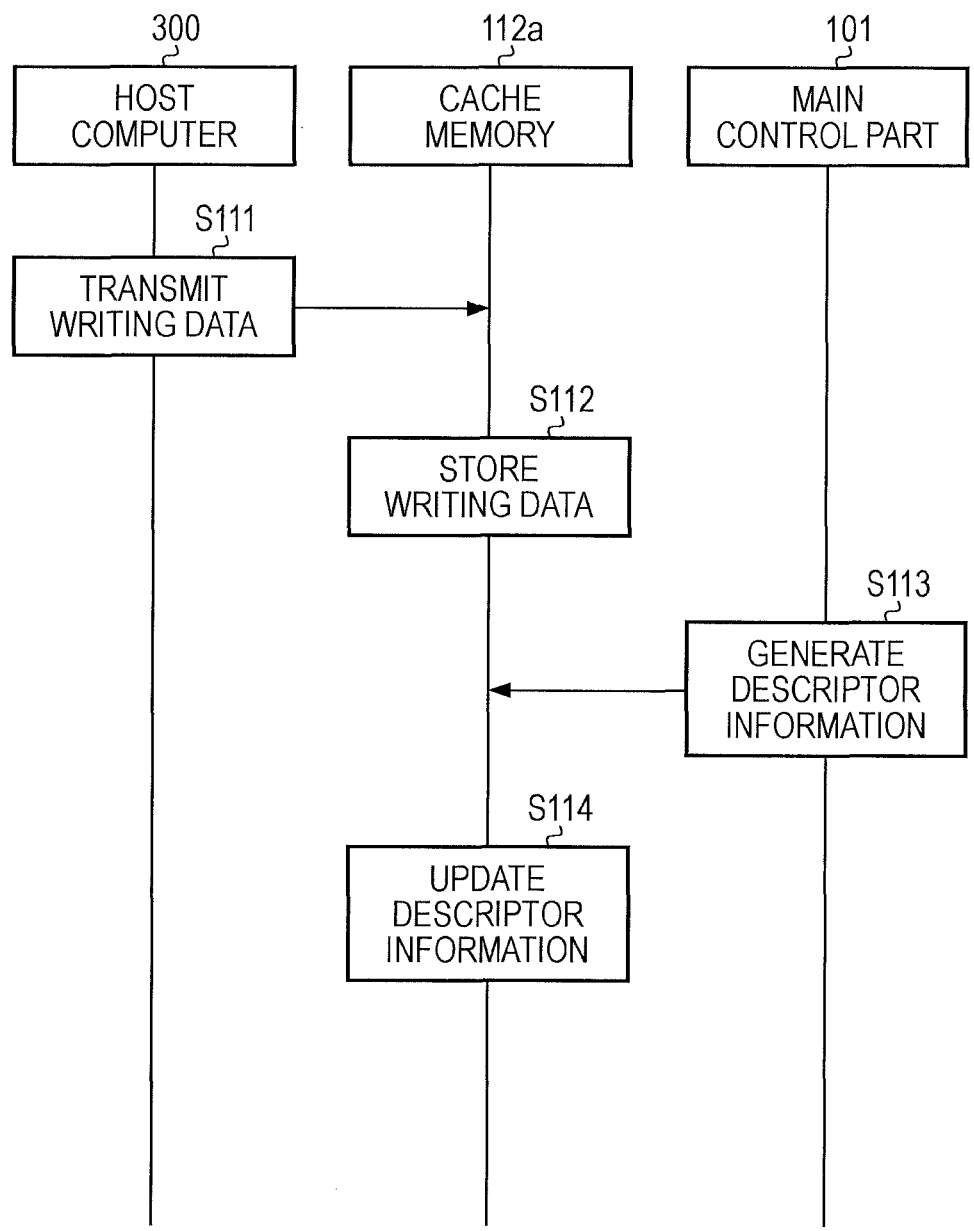

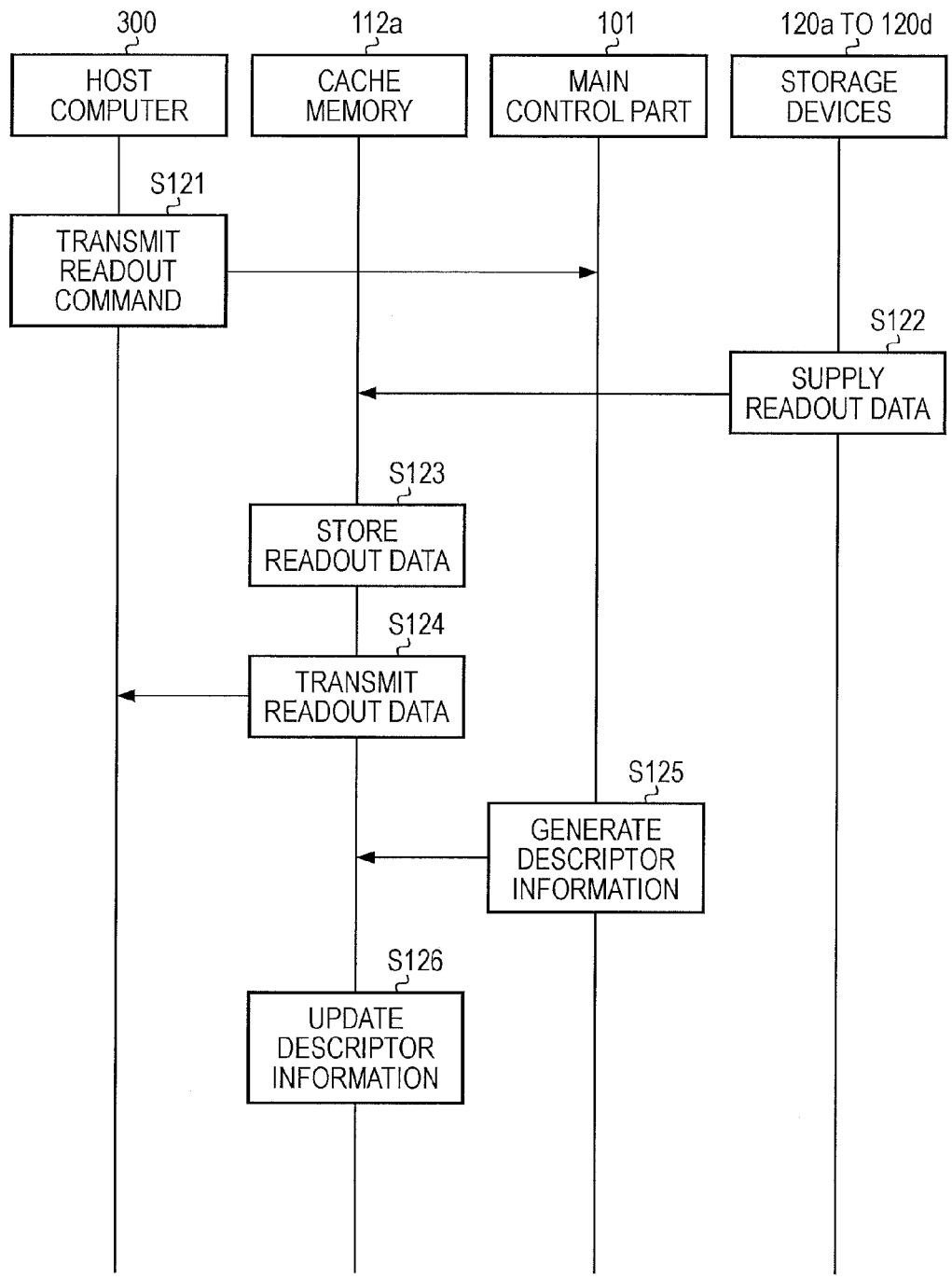

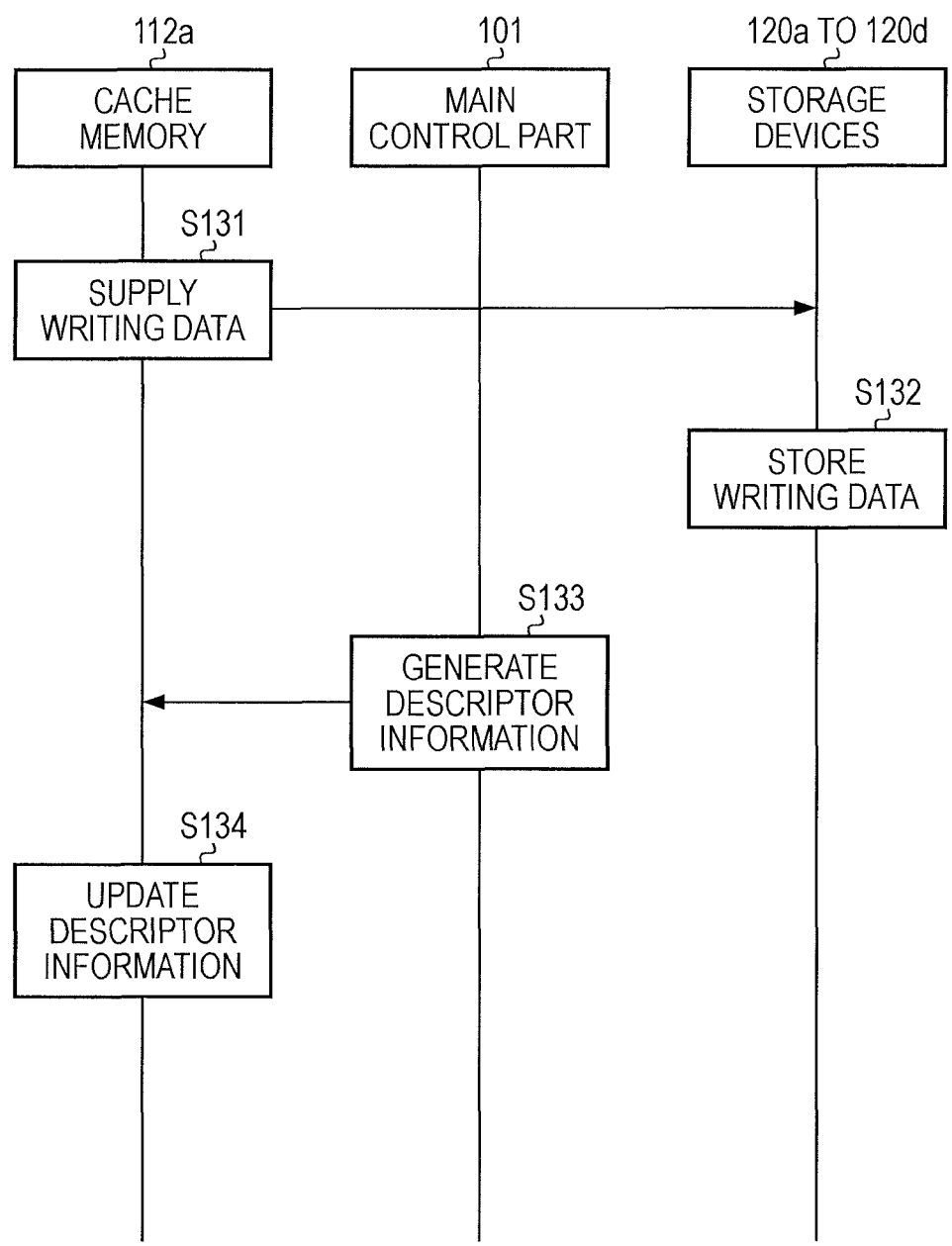

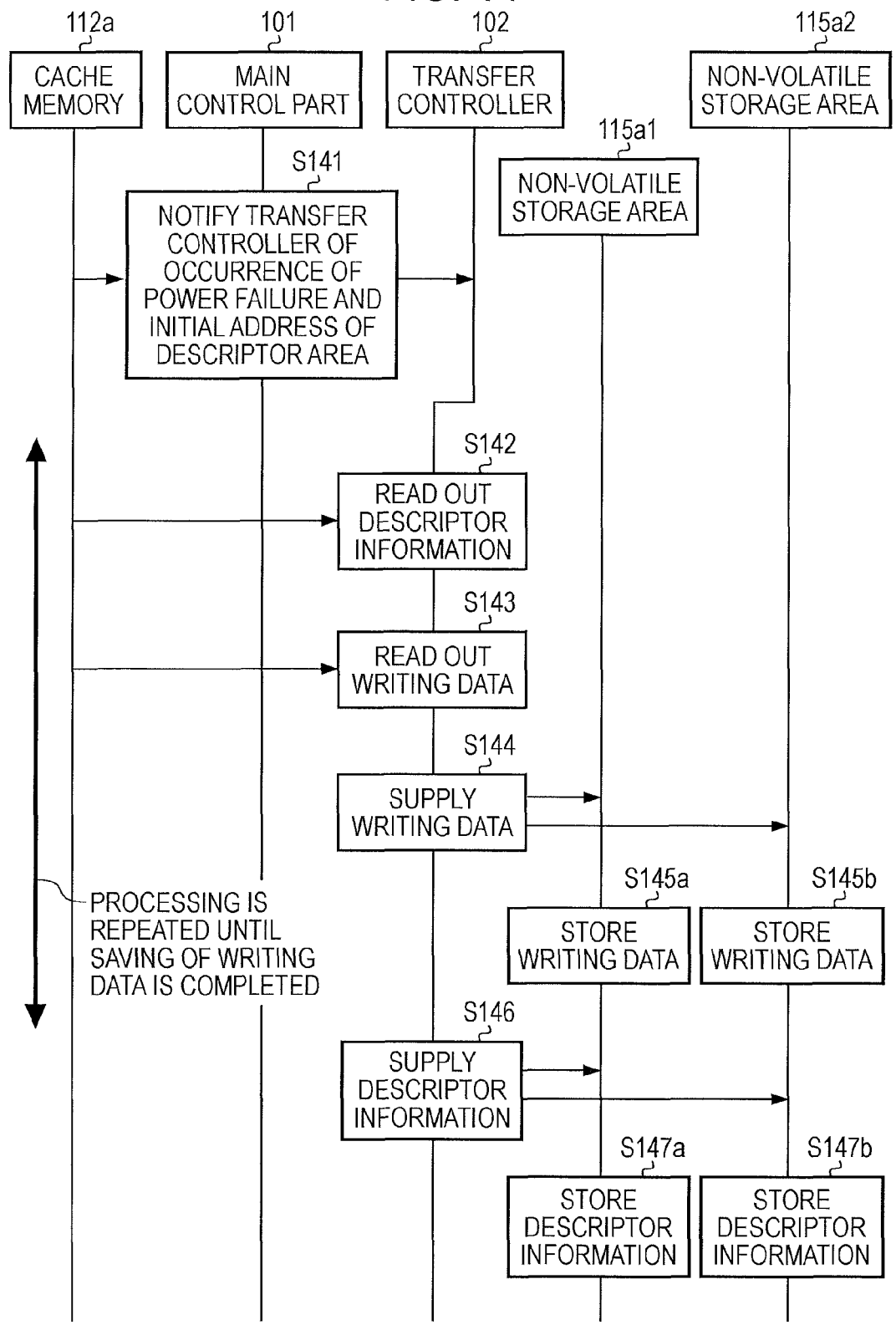

STORAGE APPARATUS AND CONTROLLING METHOD FOR DATA TRANSMISSION BASED ON CONTROL INFORMATION

CROSS-REFERENCE TO RELATED APPLICATION

This application is based upon and claims the benefit of priority of the prior Japanese Patent Application No. 2010-209389, filed on Sep. 17, 2010, the entire contents of which are incorporated herein by reference.

FIELD

The embodiments discussed herein are related to a storage apparatus and a controlling method of a storage apparatus.

BACKGROUND

Increase in storage capacities has been progressing in storage apparatuses using storage media including magnetic disks, magneto-optical disks, and optical disks. In order to increase the storage capacities of the storage apparatuses, a technology called Redundant Arrays of Inexpensive Disks (RAID) to use multiple storage media to compose a storage apparatus is in widespread use.

Readout and writing of user data by using a cache memory is generally performed in such a storage apparatus in order to reduce the processing time needed for data access from a higher-level apparatus (for example, a host computer). A semiconductor memory, such as a dynamic random access memory (DRAM) or a static random access memory (SRAM), is normally used as the cache memory.

Upon reception of a request to read out user data from the host computer, the storage apparatus searches the cache memory for the user data to acquire the user data corresponding to the readout request and notifies the host computer of cache data that is acquired. If no user data is acquired from the cache memory, the storage apparatus acquires the user data stored in a storage device, such as a hard disk drive (HDD), and writes the acquired user data in the cache memory.

Upon reception of a request to write user data, the storage apparatus notifies the host computer that a writing process is completed at the time when the user data is stored in the cache memory. Then, the storage apparatus stores the user data stored in the cache memory in a disk.

Since a volatile semiconductor memory is used as the cache memory described above, the user data in the cache memory is erased with no supply of power to the cache memory. Accordingly, at the time of power failure, some storage apparatuses perform a backup process to save all the data in the cache memory in a non-volatile memory by using power for emergency.

However, with the technology in related art mentioned above, it takes a long time to perform the backup process. In this case, there is a problem in that the saving of the data stored in the cache memory in the non-volatile memory is not completed within a time period in which the power for emergency is capable of being supplied and, therefore, the data that is not saved is lost. Japanese Laid-open Patent Publication Nos. 6-309234 and 9-330277 are examples of related art

SUMMARY

According to an aspect of the embodiment, a storage apparatus includes a storage medium configured to store data and a control unit configured to control access to the storage medium. The control unit includes first storage configured to store data to be stored in the storage medium, a second storage configured to store data, a control information generator configured to generate control information indicating a storage state of the data in the first storage and a transfer controller configured to control transfer of the data stored in the first storage to the second storage on the basis of the control information generated by the control information generator when the supply of power to the control unit is stopped.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 11 is a sequence chart illustrating an exemplary operation to store the writing data in the cache memory according to the second embodiment;

FIG. 12 is a sequence chart illustrating an exemplary operation to transmit readout data to a host computer according to the second embodiment;

FIG. 13 is a sequence chart illustrating an exemplary operation to write back the writing data in the storage devices according to the second embodiment; and FIG. 14 is a sequence chart illustrating an exemplary operation to back up the writing data in a flash memory according to the second embodiment.

DESCRIPTION OF EMBODIMENTS

Preferred embodiments of the present techniques will be explained with reference to accompanying drawings.

First Embodiment

Figure 1:
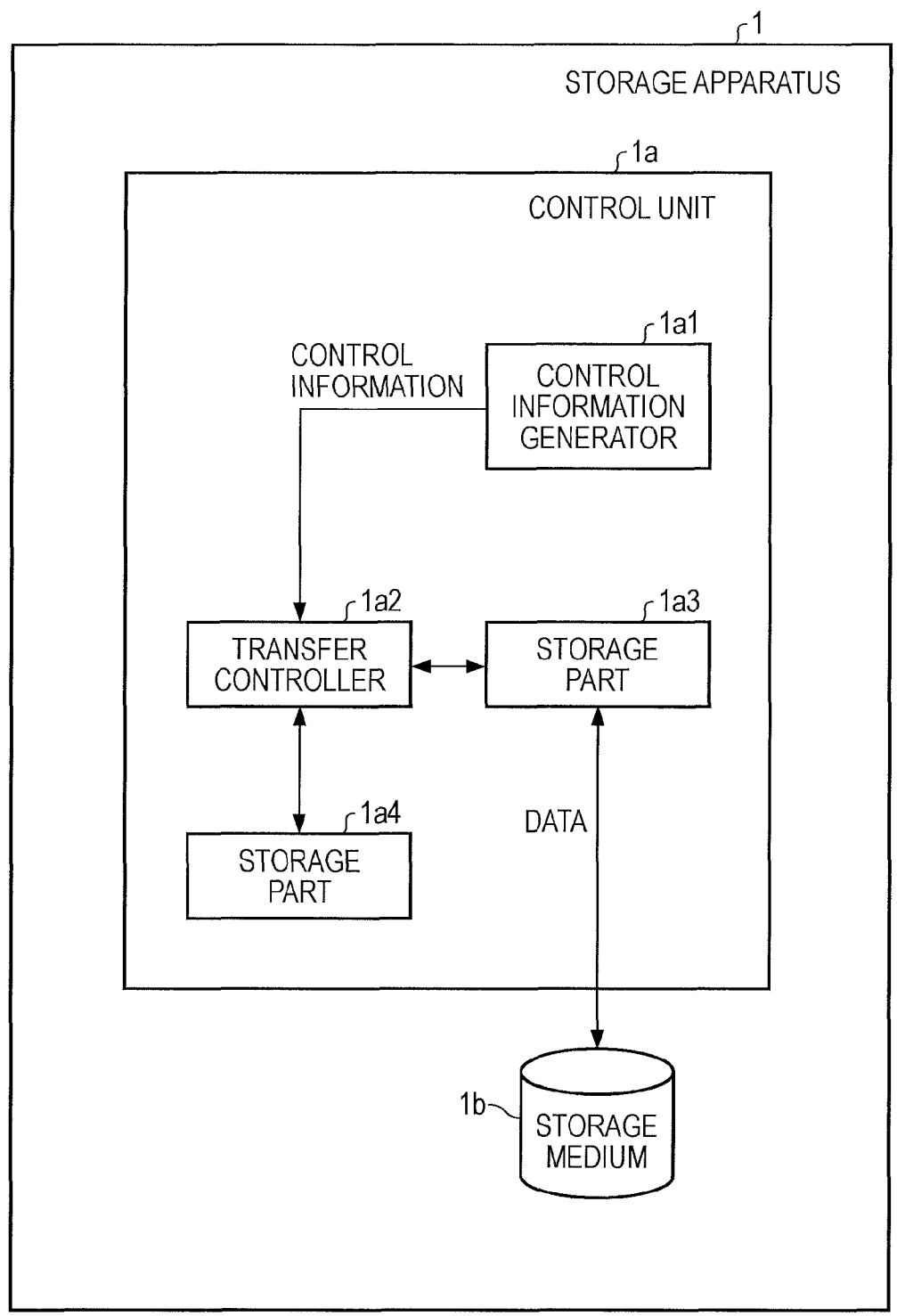
FIG. 1 is a block diagram illustrating a storage apparatus according to a first embodiment.

FIG. 1 is a block diagram illustrating a storage apparatus according to a first embodiment. Referring to FIG. 1, a storage apparatus 1 of the present embodiment includes a control unit 1a and a storage medium 1b that stores data. The control unit is controls access to the storage medium 1b. The control unit is includes a storage part 1a3, a storage part 1a4, a control information generator 1a1, and a transfer controller 1a2.

The control unit 1a controls the storage apparatus 1. For example, the control unit 1a controls writing and readout of data in and from the storage medium 1b on the basis of transmission and reception of the data between the storage apparatus 1 and a higher-level apparatus, such as a host computer.

The control information generator 1a1 generates control information indicating the storage state of data in the storage part 1a3 in advance. The control information is used by the transfer controller 1a2 to transfer the data stored in the storage part 1a3 to the storage part 1a4. The control information indicates, for example, whether each piece of the data stored in the storage part 1a3 is to be transferred, the position where each piece of the data is stored in a storage area in the storage part 1a3, and the size of each piece of the data at transfer. With the control information, it is possible to rapidly transfer the data if supply of power from a commercial power supply or the like, which is normally used, is stopped.

The transfer controller 1a2 controls the transfer of the data stored in the storage part 1a3 to the storage part 1a4 on the basis of the control information generated by the control information generator 1a1 when the supply of power to the control unit is stopped.

The storage part 1a3 temporarily stores data to be stored in the storage medium 1b until writing of the data in the storage medium 1b is completed. The storage part 1a3 is, for example, a volatile semiconductor memory, such as a DRAM or a SRAM. Accordingly, the data stored in the storage part 1a3 is lost if the supply of power to the storage part 1a3 is stopped owing to, for example, an occurrence of power failure before the writing of the data in the storage medium 1b is completed.

The storage part 1a4 is capable of holding data, for example, by using a non-volatile memory as the storage part 1a4 or receiving supply of power for emergency, separately from the storage part 1a3, even if the supply of power to the control unit 1a is stopped owing to, for example, an occurrence of power failure. In the present embodiment, when the supply of power is stopped, the data stored in the storage part 1a3 is transferred to the non-volatile storage part 1a4 by the transfer controller 1a2 to back up the data stored in the storage part 1a3. Since the data stored in the storage part 1a3 is transferred to the non-volatile storage part 1a4 at the time of power failure, it is possible to prevent the data stored in the storage part 1a3 from being lost.

The storage medium 1b stores data that is transmitted to and received from a higher-level apparatus. For example, a magnetic storage device such as an HDD, an optical disk, a magneto-optical recording medium, a non-volatile semiconductor memory such as a solid state drive (SSD), or another storage medium capable of storing data may be used as the storage medium 1b. The magnetic storage device is, for example, an HDD, a flexible disk (FD), or a magnetic tape. The optical disk is, for example, a digital versatile disk (DVD), a DVD-RAM, or a compact disc-read only memory/rewritable (CD-ROM/RW). The magneto-optical recording medium is, for example, a magneto-optical (MO) disk. The storage medium 1b may be a RAID including multiple storage media.

As described above, in the present embodiment, the control information generator 1a1 normally generates the control information indicating the storage state of the data stored in the storage part 1a3. If the supply of power is stopped, the transfer controller 1a2 transfers the data stored in the storage part 1a3 to the storage part 1a4 on the basis of the control information. Accordingly, it is possible to speed up the backup process of data to reduce the time needed for the backup process.

Second Embodiment

In a second embodiment, the function of the storage apparatus 1 illustrated in FIG. 1 to transfer data from the storage part 1a3 to the storage part 1a4 when the supply of power is stopped is applied to a storage apparatus 100 including groups of storage devices composing RAIDs.

Figure 2:
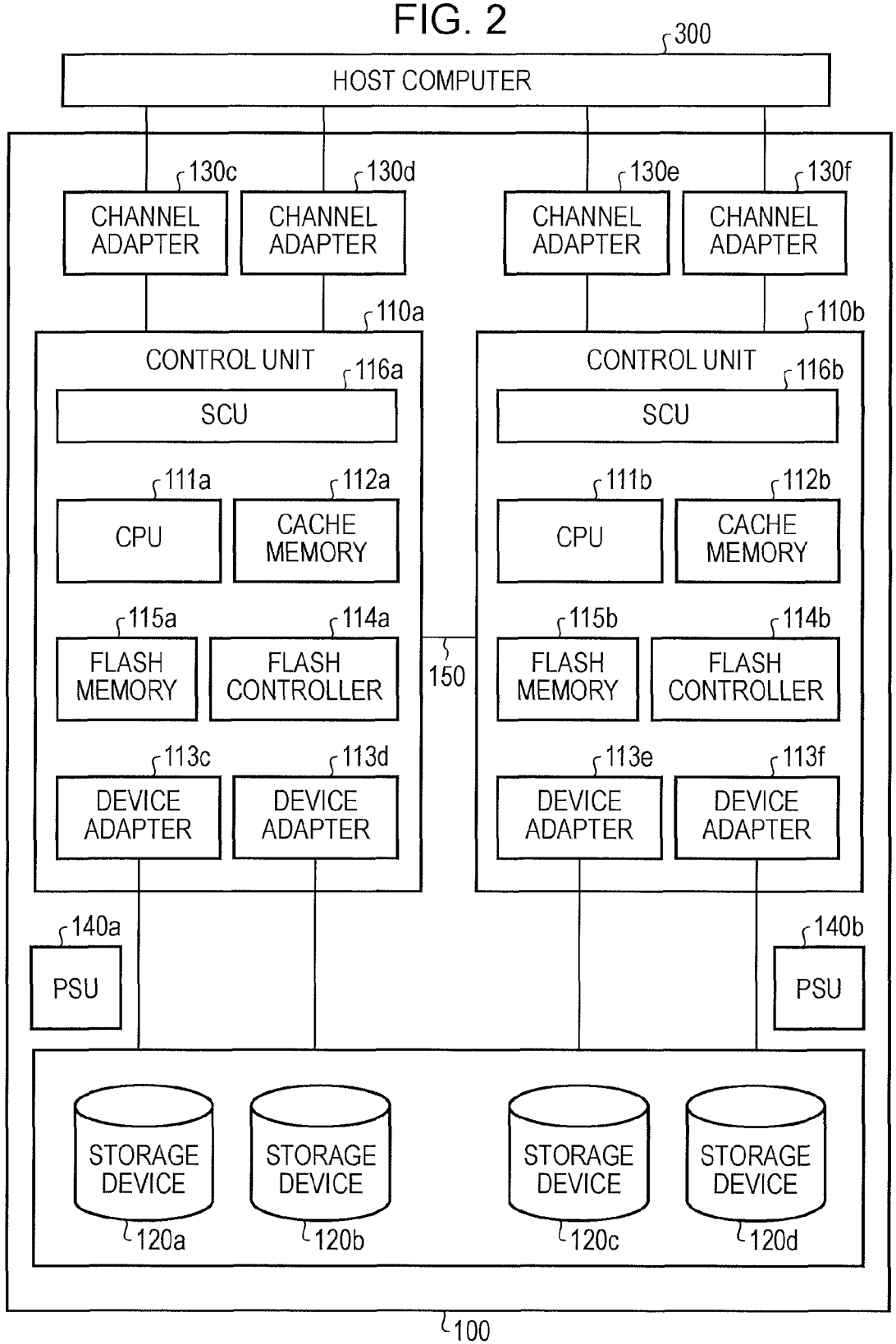
FIG. 2 is a block diagram illustrating an example of the hardware configuration of a storage apparatus of a second embodiment.

FIG. 2 is a block diagram illustrating an example of the hardware configuration of the storage apparatus 100 of the second embodiment. Referring to FIG. 2, the storage apparatus 100 includes control units 110a and 110b that control the entire apparatus, channel adapters 130c to 130f that control connection between the control units 110a and 110b and a host computer 300, storage devices 120a, 120b, 120c and 120d, and power supply units (PSUs) 140a and 140b.

The storage apparatus 100 inputs and outputs data into and from the multiple storage devices, such as hard disk drives, described below. The storage apparatus 100 has RAID functions including RAID 0 to 6. The multiple storage devices are integrated to compose RAIDs and each of the RAIDs is managed as one storage device.

The host computer 300 executes operational processes and is connected to the storage apparatus 100 via a storage area network (SAN) using a fibre channel so as to be capable of data communication. The host computer 300 stores data used in the operational processes in the storage apparatus 100 and reads out the data from the storage apparatus 100.

The control unit 110a includes a central processing unit (CPU) 111a, a cache memory 112a, device adapters 113c and 113d, a flash controller 114a, a flash memory 115a, and a system capacity unit (SCU) 116a.

The CPU 111a executes processing in accordance with, for example, an operating system (OS) to perform various control processes. The control unit 110a manages resources including the cache memory 112a, the storage devices 120a, 120b, 120c, and 120d, and the channel adapters 130c and 130d.

The cache memory 112a stores control data, such as descriptor information used in a backup process of writing data, which is needed by the CPU 111a to control the storage apparatus 100. In addition, the cache memory 112a temporarily stores writing data that is transmitted from the host computer 300 and that is to be stored in the storage devices 120a to 120d and readout data that is read out from the storage devices 120a to 120d in response to a readout request transmitted from the host computer 300 and that is to be transmitted to the host computer 300.

The device adapters 113c and 113d control connection with the storage devices 120a to 120d.

The flash controller 114a is a field programmable gate array (FPGA), which is an integrated circuit controlled by a certain program, and controls the flash memory 115a. The flash controller 114a adapts Direct Memory Access (DMA) having a function needed for saving cache data in the flash memory 115a at the time of power failure and decomposing the cache data. Accordingly, the flash controller 114a is capable of transferring data between the storage apparatus 100 and the cache memory 112a or the flash memory 115a through hardware not via the CPU 111a. The flash controller 114a backs up the writing data in the cache memory 112a in the flash memory 115a on the basis of the descriptor information at the time of power failure to save the writing data. Since the flash memory 115a, which is a NAND memory, has a structure in which access is performed in units of blocks, the writing data in the cache memory 112a is written into the flash memory 115a not in a random access mode but in a sequential write mode. The block means a data area in which the writing data is stored in the flash memory 115a and indicates a physical division unit of the flash memory 115a. The writing data is written into the flash memory 115a for every block. The data area per one block in the flash memory 115a may have a size of four megabytes, which is convenient for the sequential write mode. At the time of power restoration, the flash controller 114a reads out the writing data saved in the flash memory 115a at the time of power failure and decomposes the writing data in the cache memory 112a.

The flash memory 115a is a rewritable non-volatile semiconductor memory, such as a NAND flash memory. The flash memory 115a is used as a destination where the data is saved at the time of power failure. At the time of power failure, the flash controller 114a temporarily stores the descriptor information and the writing data that is accumulated in the cache memory 112a and that has not been stored in the storage devices 120a to 120d in the flash memory 115a while the control unit 110a is turned off. Then, the flash controller 114a reads out the data saved in the flash memory 115a at the time of power restoration and uses the readout data.

The SCU 116a is a high-capacity capacitor. The control unit 110a charges the power, which is normally supplied from the PSUs 140a and 140b, in the SCU 116a. The SCU 116a supplies the power to the control unit 110a at the time of power failure. Since the SCU 116a supplies the charged power to the control unit 110a, a limited amount of power is supplied to the control unit 110a. The SCU 116a uses an "electric double layer" (an insulating material is sandwiched between conductors and the charge is accumulated in response to a voltage that is applied) to physically accumulate the charge. Accordingly, since deterioration owing to the charge or discharge is suppressed in the SCU 116a, compared with a battery that chemically accumulates the charge, and the power is charged at a speed at which the charge moves, the time needed for the charging is relatively short.

The storage apparatus 100 switches the source of the power to be supplied to the control unit 110a from the PSUs 140a and 140b to the SCU 116a at the time of power failure. The control unit 110a uses the power charged in the SCU 116a to back up the writing data.

The control unit 110a is connected to the control unit 110b via a bus 150. The control information and data are communicated between the control unit 110a and the control unit 110b through the bus 150. The control units 110a and 110b are detachably mounted to the storage apparatus 100. The control unit 110b includes a CPU 111b, a cache memory 112b, device adapters 113e and 113f, a flash controller 114b, a flash memory 115b, and a SCU 116b. Since the control unit 110b has the same configuration as that of the control unit 110a, a description the configuration of the control unit 110b is omitted herein.

The storage devices 120a to 120d are hard disk drives that are capable of composing a RAID and stores user data transmitted from the host computer 300. The user data is not necessarily stored in one hard disk and may be stored in multiple hard disks. Alternatively, multiple pieces of user data may be stored in one hard disk. For example, a non-volatile semiconductor memory such as an SSD, a magnetic storage device other than the HDD, an optical disk, a magneto-optical recording medium, or another storage medium capable of storing data may be used as each of the storage devices 120a to 120d. The magnetic storage device is, for example, a hard disk device, a flexible disk, or a magnetic tape. The optical disk is, for example, a DVD, a DVD-RAM, or a CD-ROM/RW. The magneto-optical recording medium is, for example, an MO disk.

The channel adapters 130c to 130f control connection between the host computer 300 and the control units 110a and 110b. For example, the channel adapter 130c controls connection with the control unit 110a in response to a request from the host computer 300. The control units 110a and 110b are each capable of being connected to multiple (two in FIG. 2) channel adapters, among the channel adapters 130c to 130f. Specifically, for example, the control unit 110a is connected to the two different channel adapters 130c and 130d so as to realize a redundant configuration.

Although the communication between the channel adapters 130c to 130f and the host computer 300 is established via the SAN using the fibre channel, the communication may be established by a connection method other than the fibre channel. Alternatively, the communication between the channel adapters 130c to 130f and the host computer 300 may be established via a dedicated line or a virtual private network (VPN) and the storage apparatus 100 may be installed at a site remote from the host computer 300.

The PSUs 140a and 140b supply power used in each component in the storage apparatus 100 to the component in the storage apparatus 100. The PSUs 140a and 140b are redundant and are capable of supplying the power needed for driving each component in the storage apparatus 100 as long as either of them is normally operated.

Although the two control units 110a and 110b are illustrated, the two device adapters 113c and 113d and the two channel adapters 130c and 130d are illustrated for the control unit 110a, and the two device adapters 113e and 113f and the two channel adapters 130e and 130f are illustrated for the control unit 110b in FIG. 2, the numbers of the control units, the device adapters, and the channel adapters may be arbitrarily set.

Although one host computer 300 is connected to the storage apparatus 100 in FIG. 2, multiple host computers may be connected to the storage apparatus 100.

An extension apparatus (not illustrated) including a control unit and storage devices, which are controlled dependently of the control units 110a and 110b, may be connected to the storage apparatus 100.

With the above hardware configuration, it is possible to realize the processing function of the present embodiment.

Figure 3:
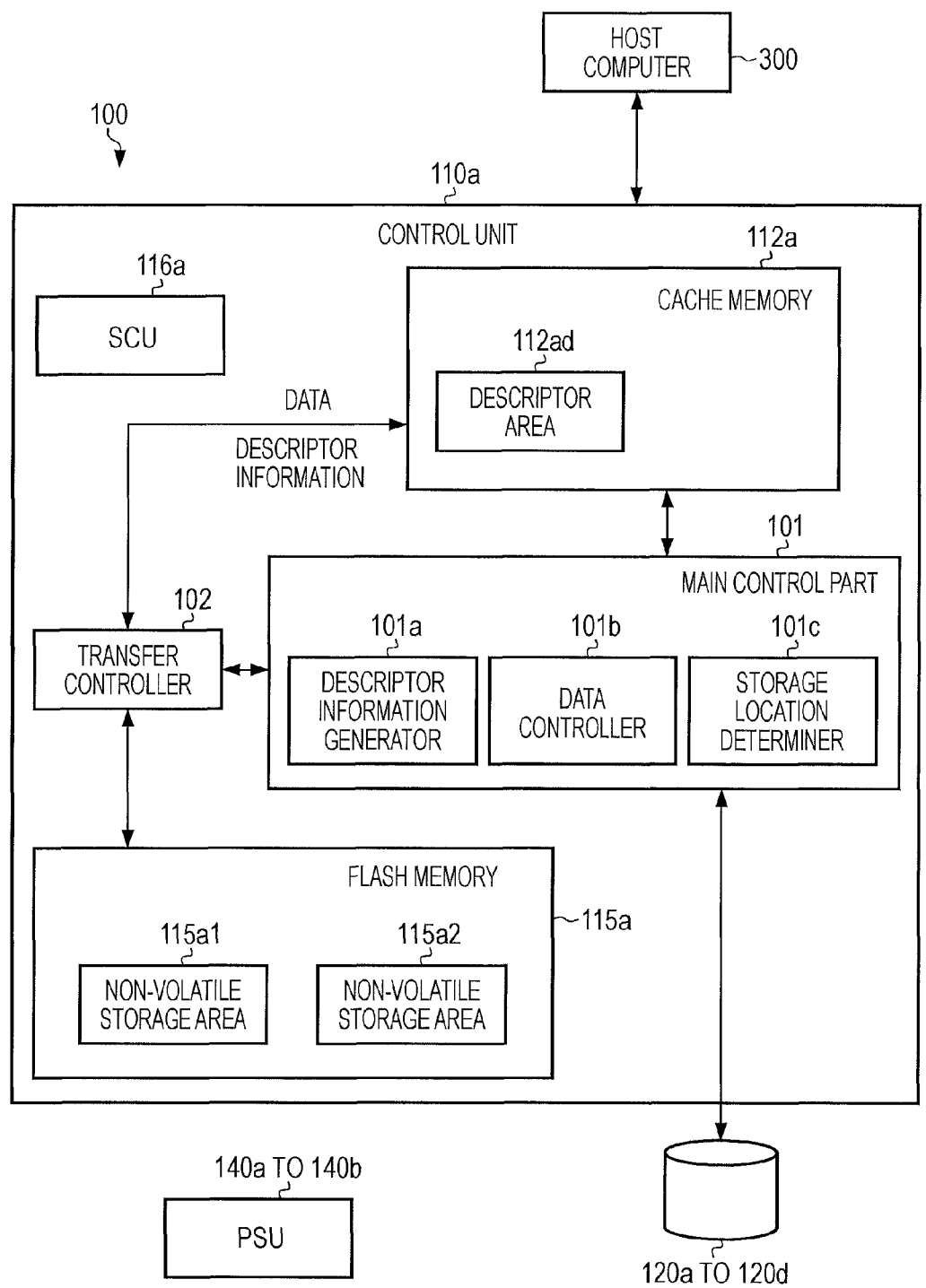
FIG. 3 is a block diagram illustrating examples of the functions of the storage apparatus of the second embodiment.

FIG. 3 is a block diagram illustrating examples of the functions of the storage apparatus 100 of the second embodiment. Referring to FIG. 3, the storage apparatus 100 of the present embodiment includes the control unit 110a, the PSUs 140a and 140b, and the storage devices 120a to 120d. The control unit 110a includes a main control part 101, a transfer controller 102, the cache memory 112a, the flash memory 115a, and the SCU 116a. The main control part 101 includes a descriptor information generator 101a, a data controller 101b, and a storage location determiner 101c. The control unit 110a will now be described. Since the control unit 110b has the same configuration and function as those of the control unit 110a, a description of the configuration and function of the control unit 110b is omitted herein.

The control unit 110a controls the storage apparatus 100. For example, the control unit 110a controls writing and readout of data in and from the storage devices 120a to 120d on the basis of, for example, transmission and reception of the data between the storage apparatus 100 and a higher-level apparatus, such as the host computer 300.

Upon reception of an instruction to store data in the storage devices 120a to 120d from the host computer 300, the descriptor information generator 101a generates descriptor information indicating the storage state of the data in the cache memory 112a based on the storage instruction. The descriptor information is an example of the control information. The descriptor information generator 101a is an example of a control information generating part.

The descriptor information is used by the transfer controller 102 to transfer the data stored in the cache memory 112a to the flash memory 115a. The descriptor information includes, for example, determination information indicating whether each piece of the data stored in the cache memory 112a is to be transferred; storage location information indicating a storage location that is of each piece of the data stored in the cache memory 112a and that is determined by the storage location determiner 101c; subsequent data location information indicating an initial address of a storage area which is next to the storage area in the cache memory 112a where the data is stored and in which other subsequent data is stored; and transfer size information indicating, for example, the size of each piece of the data at transfer. With the above information, it is possible to rapidly transfer the data when the supply of power is stopped.

When the data stored in the cache memory 112a is to be transferred, the descriptor information generator 101a generates the descriptor information so as to include the determination information indicating that the data stored in the cache memory 112a is data to be transferred (hereinafter referred to as a transfer target data) (a writing cache).

When the data stored in the cache memory 112a is not to be transferred, the descriptor information generator 101a generates the descriptor information so as to include the determination information indicating that the data stored in the cache memory 112a is not the transfer target data (a readout cache).

When the data (the writing data) to be stored in the storage devices 120a to 120d is stored in the cache memory 112a, the descriptor information generator 101a generates the descriptor information so as to include the determination information indicating that the data stored in the cache memory 112a is the transfer target data.

When the storage of the data to be stored in the storage devices 120a to 120d in the storage devices 120a to 120d is completed, the descriptor information generator 101a generates the descriptor information so as to include the determination information indicating that the data that has been stored in the cache memory 112a is not the transfer target data.

In addition, the descriptor information generator 101a generates the descriptor information so as to include the storage location information and the subsequent data location information about the data stored in the cache memory 112a.

Furthermore, the descriptor information generator 101a generates the descriptor information about the data stored in the cache memory 112a and stores the generated descriptor information at a location which corresponds to the location determined by the storage location determiner 101c and at which the descriptor information is stored in a descriptor table.

The descriptor information generator 101a may generate the control information indicating the storage state of the data in the cache memory 112a in advance in preparation for stop of the supply of power at arbitrary timing, such as every predetermined time, each time a certain amount of data is written, or each time a certain number of data items are written.

The data controller 101b controls the data that is transmitted from the host computer 300 and that is to be stored in the storage devices 120a to 120d so as to be stored in a free space in the storage area in the cache memory 112a on the basis of the storage location information in the descriptor information generated by the descriptor information generator 101a.

The storage location determiner 101c determines the storage location of data in the storage area in the cache memory 112a on the basis of the free space in the storage area in the cache memory 112a and the size of the data stored in the cache memory 112a in the storage of the data that is transmitted from the host computer 300 and that is to be stored in the storage devices 120a to 120d in the cache memory 112a.

The transfer controller 102 controls the transfer target data, among the data stored in the cache memory 112a on the basis of the descriptor information generated by the descriptor information generator 101a, and the descriptor information stored in the cache memory 112a so as to be transferred to the flash memory 115a when the supply of power to the control unit 110a is stopped. Since the descriptor information that indicates the storage state of the backed-up data and that is used in the restoration is transferred to the flash memory 115a along with the data to be backed up at stop of the supply of power in the present embodiment, it is possible to speed up a restoration process of the data at restart of the supply of power.

The transfer controller 102 controls the data that is not the transfer target data, among the data stored in the cache memory 112a on the basis of the descriptor information generated by the descriptor information generator 101a, so as not to be transferred to the flash memory 115a.

When the supply of power to the control unit 110a is stopped, the transfer controller 102 divides the data stored in the cache memory 112a into multiple pieces of data on the basis of the descriptor information generated by the descriptor information generator 101a. Then, the transfer controller 102 controls the transfer of the data stored in the cache memory 112a to the flash memory 115a such that the multiple pieces of data resulting from the division are concurrently transferred to the multiple storage areas.

When the supply of power to the control unit 110a is stopped, the transfer controller 102 receives the supply of power from the SCU 116a and controls the transfer of the data stored in the cache memory 112a to the flash memory 115a.

In saving of the writing data in the cache memory 112a, the transfer controller 102 divides the multiple pieces of writing data stored in the cache memory 112a into two groups. The transfer controller 102 stores one of the two groups in a non-volatile storage area 115a1 and stores the remaining group in a non-volatile storage area 115a2 concurrently with the writing into the non-volatile storage area 115a1. Accordingly, it is possible to reduce the time needed for saving the writing data in the flash memory 115a.

In restoration of the data saved in the flash memory 115a, the transfer controller 102 decomposes the descriptor information saved in the flash memory 115a in a descriptor area 112ad in the cache memory 112a. Then, the transfer controller 102 refers to the descriptor information decomposed in the descriptor area 112ad to sequentially decompose the saved writing cache in the storage area in the cache memory 112a from the initial address of the storage area in the cache memory 112a.

The cache memory 112a temporarily stores the data to be stored in the storage devices 120a to 120d until the writing into the storage devices 120a to 120d is completed. The cache memory 112a is a volatile semiconductor memory, such as a DRAM or a SRAM. Accordingly, the data stored in the cache memory 112a is lost if the supply of power to the cache memory 112a is stopped owing to, for example, an occurrence of power failure before the writing into the storage devices 120a to 120d is completed.

The cache memory 112a includes the descriptor area 112ad where the descriptor information is stored. The descriptor information and the descriptor table are stored in the descriptor area 112ad. In the descriptor table, the locations where the descriptor information is stored in the storage area in the cache memory 112a are associated with the locations where the data is stored in the storage area in the cache memory 112a. The descriptor area 112ad is an example of a control information storage part. The descriptor table will be described in detail with reference to FIG. 4.

The flash memory 115a is a non-volatile memory including multiple storage areas (for example, the non-volatile storage areas 115a1 and 115a2). The flash memory 115a is capable of holding the stored data even when the supply of power to the control unit 110a is stopped owing to, for example, an occurrence of power failure. In the present embodiment, when the supply of power is stopped, the data stored in the cache memory 112a is transferred to the flash memory 115a by the transfer controller 102 by using the power received from the SCU 116a to back up the data stored in the cache memory 112a. Since the data stored in the cache memory 112a is transferred to the non-volatile flash memory 115a at the time of power failure, it is possible to prevent the data stored in the cache memory 112a from being lost. Although the flash memory 115a includes the two non-volatile storage areas in the present embodiment, the number of the non-volatile storage areas is not limited to two. The flash memory 115a may include one non-volatile storage area or three or more non-volatile storage areas.

The storage devices 120a to 120d are hard disk drives that store data transmitted to and received from a higher-level apparatus to compose a RAID.

The SCU 116a supplies a certain amount of power to each component in the control unit 110a when the supply of power which is supplied from the PSUs 140a and 140b to the control unit 110a and which is normally used is stopped. The SCU 116a is capable of supplying power sufficient for the transfer controller 102 of the present embodiment to transfer the writing cache in the backup process even when the supply of power which is normally used is stopped. In the present embodiment, it is possible to suppress an increase in size of the data to be backed up and to improve the efficiency of the backup process with the descriptor information, thereby reducing the power supply capacity needed for the SCU 116a.

Although the flash memory 115a is used to back up the data in the cache memory 112a in the present embodiment, the backup process is not limited to this. A volatile semiconductor memory may be used for the backup and the SCU 116a may supply power to the volatile semiconductor memory at stop of the supply of power to the control unit 110a to back up the data in the cache memory 112a. In other words, a volatile memory may be used, instead of the non-volatile memory, to back up the data in the cache memory 112a.

Figure 4:
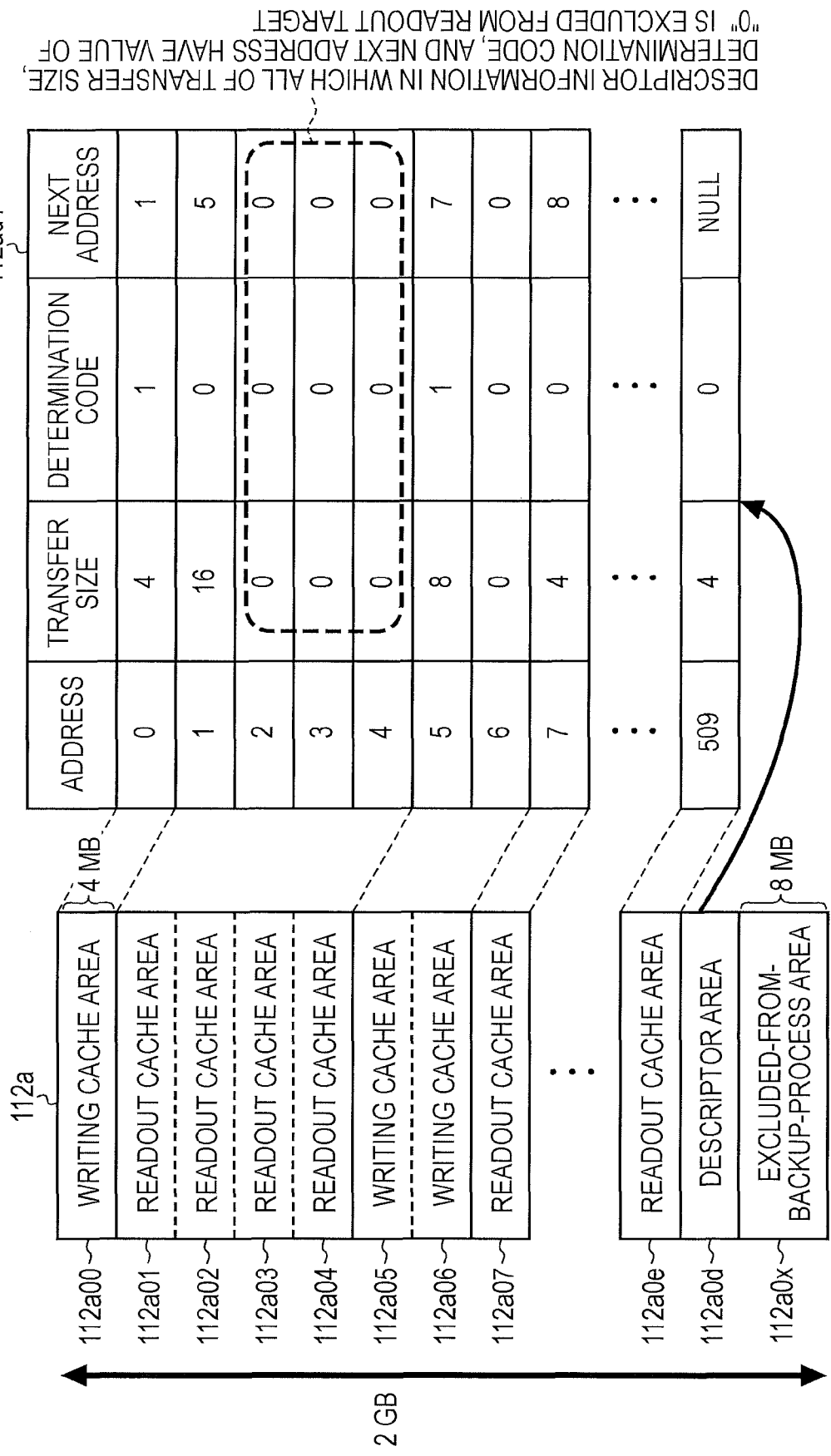
FIG. 4 illustrates an example of a cache memory and a descriptor table according to the second embodiment.

FIG. 4 illustrates an example of the cache memory and the descriptor table according to the second embodiment. A descriptor table 112ad1 in which the descriptor information stored in the cache memory 112a is held is illustrated in FIG. 4.

The cache memory 112a temporarily stores the writing data that is transmitted from the host computer 300 and that is to be stored in the storage devices 120a to 120d and the readout data that is read out from the storage devices 120a to 120d and that is to be transmitted to the host computer 300, in the storage apparatus 100. Although the cache memory 112a has a storage capacity of two gigabytes in the present embodiment, the storage capacity of the cache memory 112a is not limited to this and the cache memory 112a may have an arbitrary storage capacity. The storage area in the cache memory 112a is managed in units of subareas each having a certain storage capacity (for example, four megabytes corresponding to each block in the flash memory 115a). Each storage subarea resulting from the division in the cache memory 112a is set as a writing cache area, a readout cache area, a descriptor area, or an excluded-from-backup-process area.

The writing cache area is a storage subarea in the cache memory 112a, in which the writing cache that includes the writing data that has not been stored in the storage devices 120a to 120d and that is data to be backed up is stored. The readout cache area is a storage subarea in the cache memory 112a, in which only the readout cache is stored. The readout cache is data that is not to be backed up, such as the writing data that has been stored in the storage devices 120a to 120d and the readout data that is read out from the storage devices 120a to 120d and is to be transmitted to the host computer 300. The descriptor area is a storage subarea in the cache memory 112a, in which the descriptor information is stored. The excluded-from-backup-process area is a storage subarea in the cache memory 112a, in which data that is not to be backed up, such as control data that is not needed to be backed up, is stored.

In the example in FIG. 4, a writing cache area 112a00, readout cache areas 112a01 to 112a04, writing cache areas 112a05 and 112a06, a readout cache area 112a07, . . . , a readout cache area 112a0e, a descriptor area 112a0d, and an excluded-from-backup-process area 112a0x are set in the cache memory 112a.

The writing cache area 112a00 is a 4-MB storage area including one block and has the writing cache stored therein. The readout cache areas 112a01 to 112a04 are a 16-MB storage area including four blocks and each have the readout cache stored therein. The writing cache areas 112a05 and 112a06 are an 8-MB storage area including two blocks and each have the writing cache stored therein. The readout cache area 112a07 is a 4-MB storage area including one block and has the readout cache stored therein. The readout cache area 112a0e is a 4-MB storage area including the final one block and has the readout cache stored therein. The descriptor area 112a0d has the descriptor information stored therein. The excluded-from-backup-process area 112a0x is an 8-MB storage area and has, for example, the control data that is not needed to be backed up stored therein.

The descriptor table 112ad1 is stored in the descriptor area 112a0d in the cache memory 112a included in the storage apparatus 100. The descriptor table 112ad1 holds the descriptor information indicating the writing cache, which is the writing data stored in the cache memory 112a included in the storage apparatus 100. The descriptor table 112ad1 is an example of a control table.

Items including "address", "transfer size", "determination code", and "next address" are set in the descriptor table 112ad1. Information items laterally arranged across the items are associated with each other as the descriptor information in the descriptor table 112ad1.

The address is information indicating a mapping address of each storage subarea stored in the cache memory 112a (the initial address of each of the storage subareas divided in association with the blocks in the flash memory 115a). The address is allocated to each storage subarea in the cache memory 112a such that the integer value is incremented one by one from "0" in ascending order for every certain storage capacity (for example, four gigabytes), which is used as one unit in the transfer of the data to the flash memory 115a in the backup process. The address is an example of the storage location information.

The descriptor information is collectively set in the beginning block, among multiple successive blocks in which the caches of the same type, the writing cache or the readout cache, are stored (hereinafter referred to as same-type successive blocks). The writing cache area 112a00 in FIG. 4 is a single non-successive block and the descriptor information on the writing cache area 112a00 is set at an address "0." The descriptor information on the readout cache areas 112a01 to 112a04 is set at an address "1" because the readout cache areas 112a01 to 112a04 are successive areas and have the readout caches stored therein. Similarly, the descriptor information on the writing cache areas 112a05 and 112a06 is set at an address "5." The descriptor information on the readout cache area 112a07 is set at an address "7." The descriptor information on the readout cache area 112a0e is set at an address "509." "0" is set to the transfer size, the determination code, and the next address of each block that is not the beginning block in the same-type successive blocks.

The transfer size is information indicating the size (MB) of each block stored in the cache memory 112a at transfer to the flash memory 115a. The transfer size is expressed in a certain storage capacity unit. For example, when the certain storage capacity is four megabytes, the transfer size is expressed as a multiple of the certain storage capacity, such as "0" (MB), "4", "8", or "12." The transfer size of the same-type successive blocks is set in the descriptor information on the beginning block. For example, the transfer size of the readout cache areas 112a01 to 112a04 is set as "16" in the descriptor information at the address "1." The transfer size is an example of the transfer size information.

The determination code is information indicating whether the data in each block is to be backed up. When the block includes the writing data that has not been stored in the storage devices 120a to 120d, "1" is set as the determination code. When the block does not include data that has not been stored in the storage devices 120a to 120d (that is, when all the data in the block is the readout data or when the block includes only the writing data that has been stored in the storage devices 120a to 120d), "0" is set as the determination code. In the backup process, the transfer controller 102 determines whether each block is to be backed up on the basis of the determination code and stores only the data stored in the blocks to be backed up in the flash memory 115a. The determination code of the same-type successive blocks is set in the descriptor information on the beginning block. For example, the determination code of the readout cache areas 112a01 to 112a04 is set as "0" in the descriptor information at the address "1" (readout cache). The determination code is an example of the determination information.

The next address is information indicating the mapping address of the next block. In the backup process of the writing data, the transfer controller 102 acquires the address of the next block indicated in the next address and acquires the descriptor information on the next block on the basis of the acquired address of the next block. "NULL" is set in the next address of the final data block (the readout cache area 112a0e) in the cache memory 112a. When the transfer controller 102 acquires NULL, the transfer controller 102 terminates the backup process of the cache memory 112a at the block for which NULL is acquired and backs up the descriptor area 112a0d and other needed control information. The next address of the same-type successive blocks is set in the descriptor information on the beginning block. For example, the next address of the readout cache areas 112a01 to 112a04 is set as "5" (the mapping address of the next block) in the descriptor information at the address "1." The next address is an example of the subsequent data location information.

When the transfer controller 102 stores the block to be backed up in the flash memory 115a, the determination of whether each block is to be backed up may be based on the descriptor information on the beginning block in the same-type successive blocks. In this case, since the descriptor information having "0" in the transfer size, the determination code, and the next address concerns a block that is not the beginning block in the same-type successive blocks, the block may be excluded from the readout target.

Figure 5:
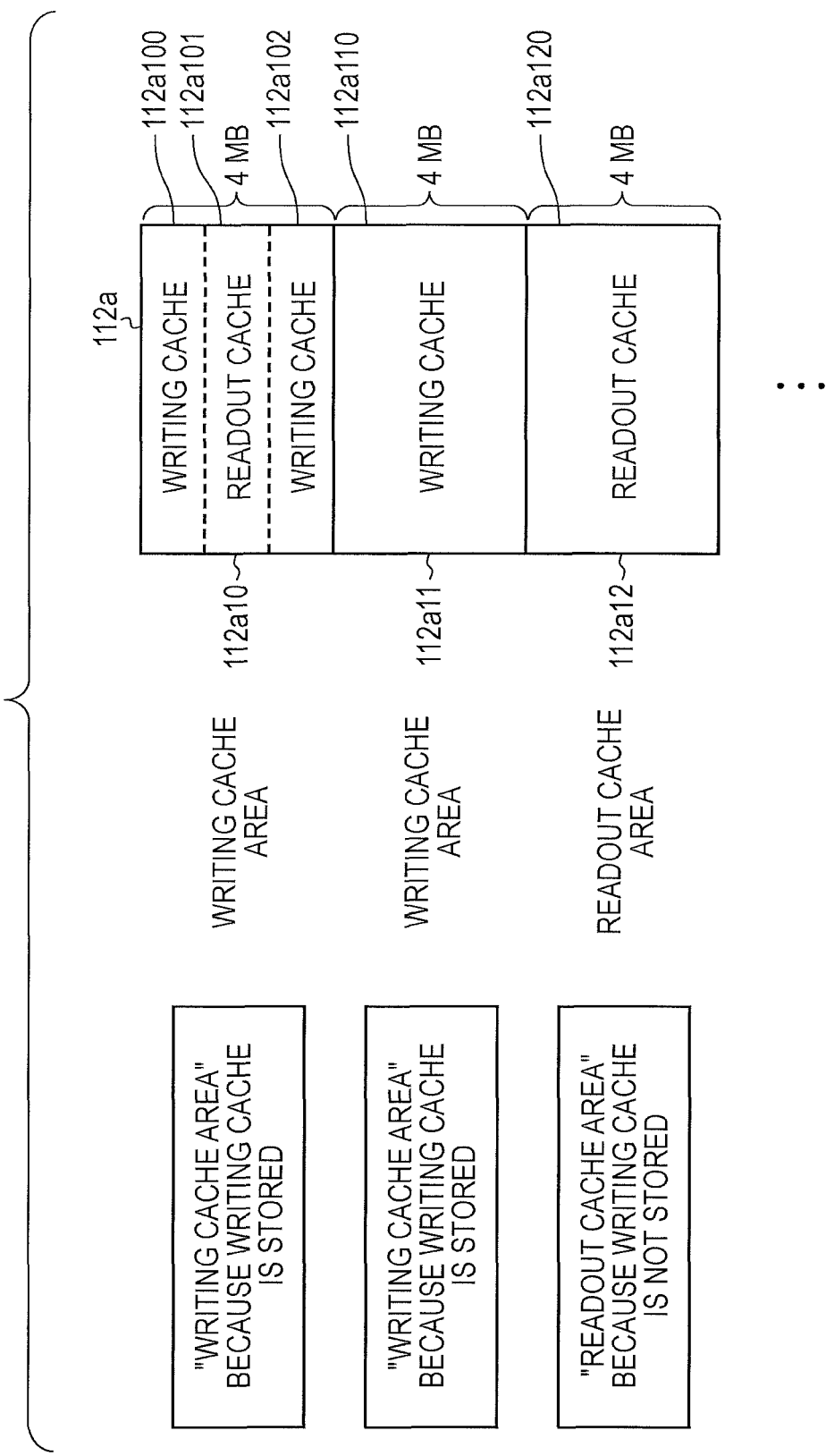
FIG. 5 illustrates examples of writing caches and readout caches stored in the cache memory according to the second embodiment.

FIG. 5 illustrates examples of the writing caches and the readout caches stored in the cache memory according to the second embodiment. As described above, either of the writing cache area to be backed up and the readout cache area not to be backed up is set to each storage subarea in the cache memory 112a in the present embodiment. In the example in FIG. 5, writing cache areas 112a10 and 112a11 and a readout cache area 112a12 each having a storage capacity of four megabyte are set in the cache memory 112a.

The writing cache area is a storage subarea in which the writing cache is partially or wholly stored, as described above. The writing cache is the writing data that has not been stored in the storage devices 120a to 120d and that is be backed up. As illustrated in FIG. 5, writing caches 112a100 and 112a102 and a readout cache 112a101 are stored in the writing cache area 112a10. Since the writing caches 112a100 and 112a102 are stored in the writing cache area 112a10, the writing cache area 112a10 corresponds to the writing cache area. Similarly, a writing cache 112a110 is stored in the writing cache area 112a11. Since the writing cache 112a110 is stored in the writing cache area 112a11, the writing cache area 112a11 corresponds to the writing cache area.

The readout cache area is a storage subarea in which no writing cache is stored and in which only the readout cache is stored, as described above. The readout cache is data that is not to be backed up, such as the writing data that has been stored in the storage devices 120a to 120d or the readout data that is read out from the storage devices 120a to 120d and is to be transmitted to the host computer 300. As illustrated in FIG. 5, a readout cache 112a120 is stored in the readout cache area 112a12. Since no writing cache is stored in the readout cache area 112a12, the readout cache area 112a12 corresponds to the readout cache area.

Figure 6:
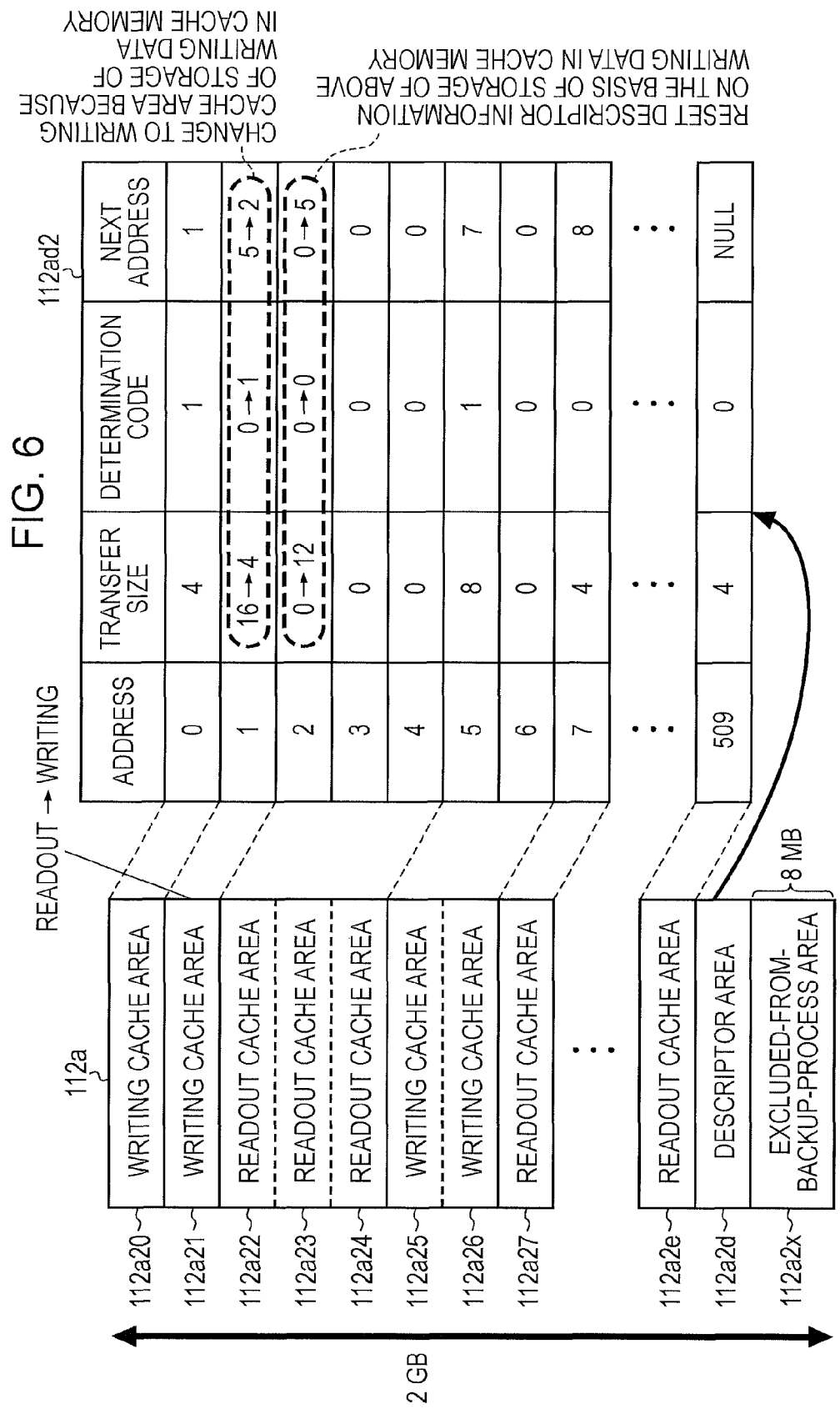
FIG. 6 illustrates an example of another cache memory and another descriptor table while a process of storing writing data in the cache memory is being executed according to the second embodiment.

FIG. 6 illustrates an example of the cache memory and the descriptor table while a process of storing the writing data in the cache memory is being executed according to the second embodiment. The cache memory 112a included in the storage apparatus 100 of the present embodiment and a descriptor table 112ad2 are illustrated in FIG. 6. The descriptor information stored in the cache memory 112a while the process of storing the writing data in the cache memory is being executed is held in the descriptor table 112ad2.

In the example in FIG. 6, the writing data is stored in the readout cache area 112a01 in the state in FIG. 4. As a result, the readout cache area 112a01 in FIG. 4 is changed to a writing cache area 112a21. The settings of writing cache areas 112a20, 112a25, and 112a26 and readout cache areas 112a22 to 112a24, 112a27, and 112a2e are not changed from the corresponding writing cache area 112a00, 112a05, and 112*a*06 and the readout cache areas 112*a*02 to 112*a*04, 112*a*07, and 112*a*0*e* in FIG. 4.

Storing the writing data in the readout cache area 112*a*01 to change the readout cache area 112*a*01 to the writing cache area 112*a*21 causes the descriptor information corresponding to the readout cache area 112*a*01 to be updated. Specifically, the transfer size (four megabytes per block) of the address "1" of the descriptor table 112*ad*2 in which the descriptor information on the writing cache area 112*a*21 is stored is updated to "4" indicating the size at the transfer of the writing cache area 112*a*21 after the change to the flash memory 115*a*. The determination code of the address "1" is updated to "1" indicating that the writing cache area 112*a*21 after the change is the writing cache area. The next address of the address "1" is updated to "2" indicating the mapping addresses of the readout cache areas 112*a*22 to 112*a*24 in the next block.

While the settings for the readout cache areas 112*a*02 to 112*a*04 (that is, the readout cache areas 112*a*22 to 112*a*24) are kept on the basis of the storage of the writing data in the readout cache area 112*a*01 to update the readout cache area 112*a*01 to the writing cache area 112*a*21, the descriptor information on the readout cache area 112*a*22, which is the beginning block, is reset. Specifically, the transfer size of the address "2" of the descriptor table 112*ad*2 in which the descriptor information on the readout cache area 112*a*22 is stored is updated to "12" indicating the size at the transfer of the readout cache areas 112*a*22 to 112*a*24, which are the same-type successive blocks, to the flash memory 115*a*. The determination code of the address "2" is kept at "0" indicating that the readout cache areas 112*a*22 to 112*a*24 are the readout cache areas. The next address of the address "2" is updated to "5" indicating the mapping address of the writing cache areas 112*a*25 and 112*a*26 in the next block.

Figure 7:
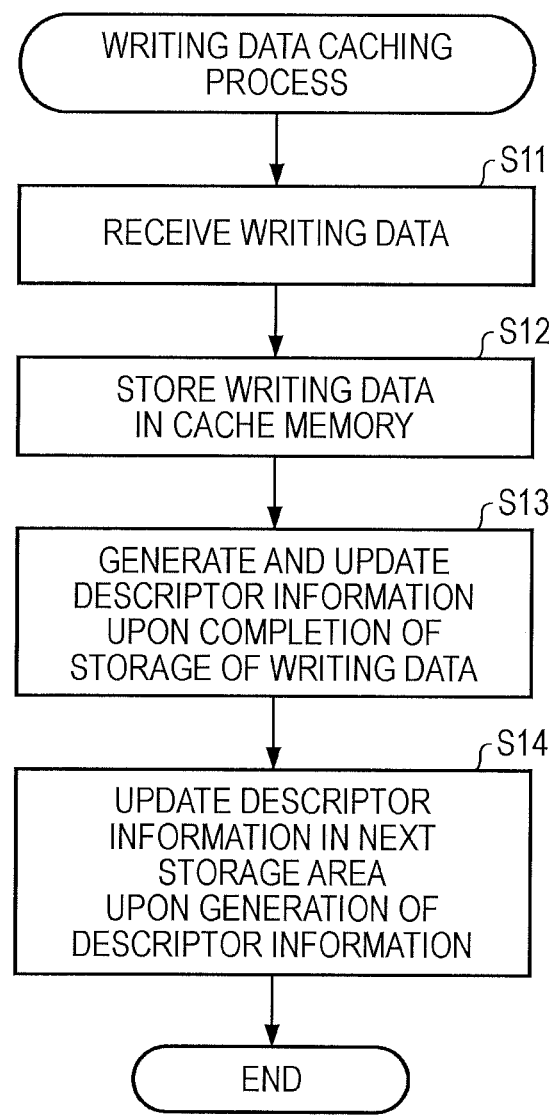
FIG. 7 is a flowchart illustrating an example of a writing data caching process according to the second embodiment.

FIG. 7 is a flowchart illustrating an example of a writing data caching process according to the second embodiment. Upon reception of the writing data to be stored in the storage devices 120*a* to 120*d* from the host computer 300, the storage apparatus 100 of the present embodiment executes the writing data caching process to temporarily store the received writing data in the cache memory 112*a* and to generate and update the descriptor information upon completion of the storage of the writing data in the cache memory 112*a*. The writing data caching process in FIG. 7 will now be described in accordance with the operation numbers in the flowchart.

In S11, the main control part 101 receives the writing data transmitted from the host computer 300.

In S12, the main control part 101 causes the cache data of the writing data (the writing cache) received in S11 to be stored in the cache memory 112*a*. For example, the writing cache, which is the cache data of the writing data, is stored in the writing cache area 112*a*21 in FIG. 6.

In S13, the main control part 101 generates the descriptor information in which the storage of the writing data is reflected upon completion of the storage of the writing data in the cache memory 112*a* in S12 and updates the descriptor information stored in the descriptor area in the cache memory 112*a* with the generated descriptor information. Specifically, the writing cache is stored in the writing cache area 112*a*21 in FIG. 6. In this case, as in the descriptor information at the address "1" in the descriptor table 112*ad*2 in FIG. 6, the descriptor information in which the transfer size is set to "4" (because the writing cache area 112*a*21 is a single non-successive writing cache area), the determination code is set to "1" (the writing cache (to be backed up)), and the next address is set to "2" (the mapping address of the readout cache area 112*a*22, which the subsequent storage area) is generated and the generated descriptor information is set in the descriptor table 112*ad*2.

In S14, the main control part 101 updates the descriptor information if it is needed to change the descriptor information on the storage area next to the storage area in which the writing cache is stored upon generation of the descriptor information in S13. For example, the writing cache is stored in part of the blocks in the readout cache areas, which is the same-type successive blocks, and the readout cache area is changed to the writing cache area. In this case, the multiple successive readout cache areas are separated or the type of the storage area of the beginning block is changed. As a result, the transfer size and/or the next address of the descriptor information in the readout cache area next to the writing cache area in which the writing cache is stored and is subjected to change may be changed. In such a case, the descriptor information generator 101*a* updates the descriptor information according to need. Specifically, as in the descriptor information at the address "2" in the descriptor table 112*ad*2 in FIG. 6, the descriptor information in which the transfer size is set to "12" (the size of the readout cache areas 112*a*22 to 112*a*24, which are the same-type successive blocks even after the storage of the writing cache), the determination code is set to "0" (the readout cache (not to be backed up)), and the next address is set to "5" (the mapping address of the writing cache area 112*a*25, which the subsequent storage area) is generated and the generated descriptor information is set in the descriptor table 112*ad*2. Then, the writing data caching process is terminated.

Although, after the writing data is stored in the cache memory 112*a* in S12, the descriptor information is generated in S13 and the descriptor information in the descriptor area is updated in S14 in the writing data caching process of the present embodiment, the writing data caching process is not limited to this. The writing data may be stored in the cache memory 112*a* after the generation and the update of the descriptor information are completed.

Figure 8:
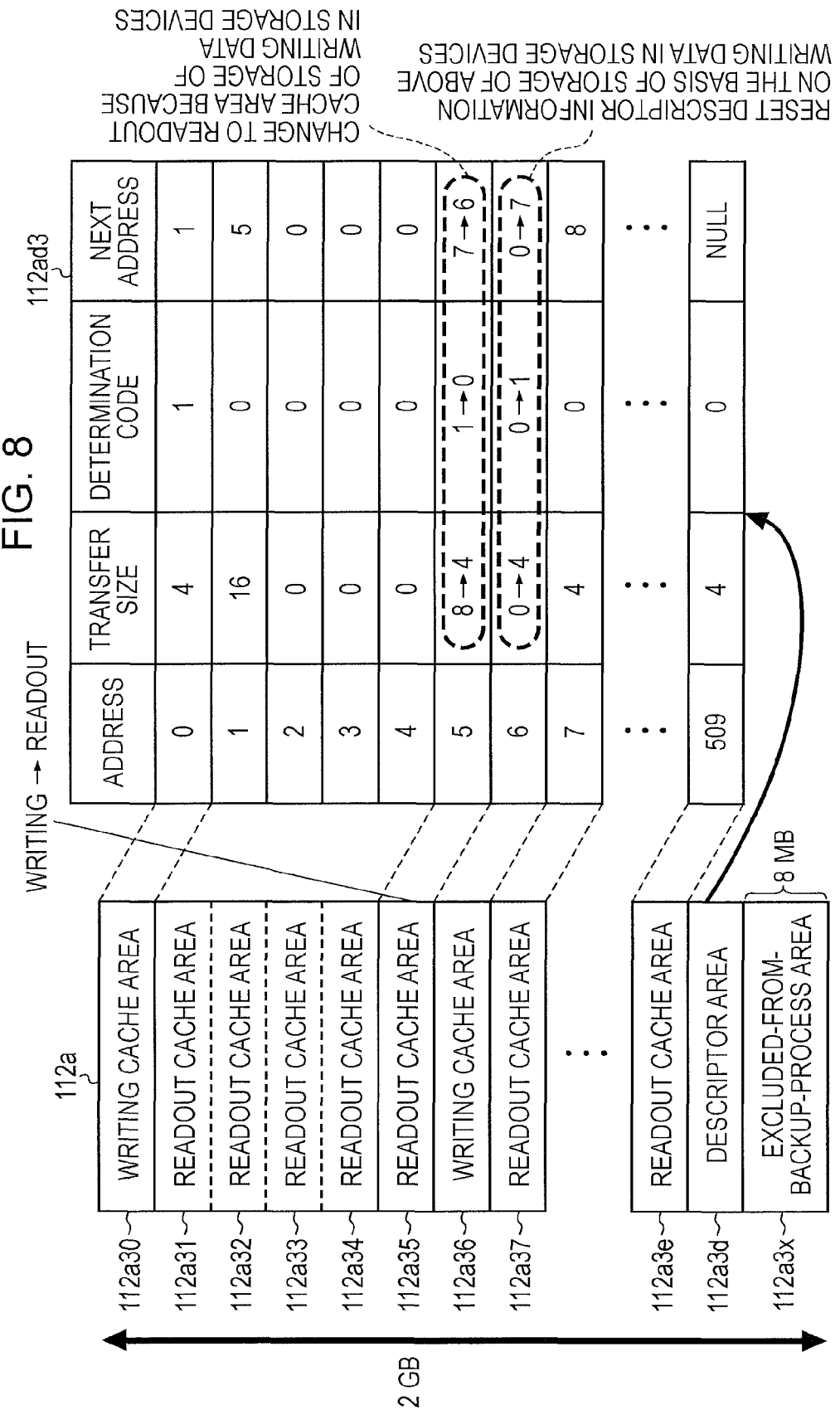
FIG. 8 illustrates an example of another cache memory and another descriptor table while a process of writing back the writing data in storage devices is being executed according to the second embodiment.

FIG. 8 illustrates an example of the cache memory and the descriptor table while a process of writing back the writing data in the storage devices is being executed according to the second embodiment. The cache memory 112*a* included in the storage apparatus 100 of the present embodiment and a descriptor table 112*ad*3 are illustrated in FIG. 8. The descriptor information stored in the cache memory 112*a* while a write-back process to store the writing data stored in the cache memory 112*a* in the storage devices 120*a* to 120*d* is being executed is held in the descriptor table 112*ad*3.

In the example in FIG. 8, the writing data stored in the writing cache area 112*a*05 in the state in FIG. 4 is written back into the storage devices 120*a* to 120*d*. As a result, the writing cache area 112*a*05 in FIG. 4 is changed to a readout cache area 112*a*35 because the backup process is not needed for the block stored in the writing cache area 112*a*05. The settings of writing cache areas 112*a*30 and 112*a*36 and readout cache areas 112*a*31 to 112*a*34, 112*a*37, and 112*a*3*e* are not changed from the corresponding writing cache area 112*a*00 and 112*a*06 and the readout cache areas 112*a*01 to 112*a*04, 112*a*07, and 112*a*0*e* in FIG. 4.

Writing back the writing data stored in the writing cache area 112*a*05 to change the writing cache area 112*a*05 to the readout cache area 112*a*35 causes the descriptor information corresponding to the writing cache area 112*a*05 to be updated. Specifically, the transfer size of the address "5" of the descriptor table 112*ad*3 in which the descriptor information on the readout cache area 112*a*35 is stored is updated to "4" indicating the size at the transfer of the readout cache area 112a35 after the change to the flash memory 115a. The determination code of the address "5" is updated to "0" indicating that the readout cache area 112a35 after the change is the readout cache area. The next address of the address "5" is updated to "6" indicating the mapping addresses of the writing cache area 112a36 in the next block.

While the settings for the writing cache area 112a06 (that is, the writing cache area 112a36) are kept on the basis of the write-back of the writing data in the writing cache area 112a05 to update the writing cache area 112a05 to the readout cache area 112a35, the descriptor information on the writing cache area 112a36 is reset. Specifically, the transfer size of the address "6" of the descriptor table 112ad3 in which the descriptor information on the writing cache area 112a36 is stored is updated to "4" indicating the size at the transfer of the writing cache area 112a36 to the flash memory 115a. The determination code of the address "6" is updated to "1" indicating that the writing cache area 112a36 is the writing cache area. The next address of the address "6" is updated to "7" indicating the mapping address of the readout cache area 112a37 in the next block.

Figure 9:
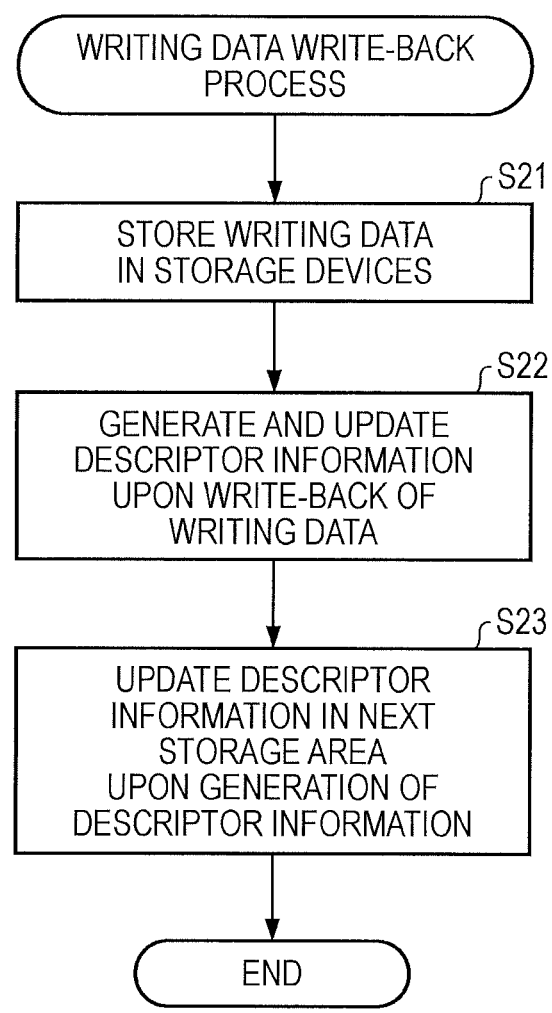
FIG. 9 is a flowchart illustrating an example of a writing data write-back process according to the second embodiment.

FIG. 9 is a flowchart illustrating an example of a writing data write-back process according to the second embodiment. The storage apparatus 100 of the present embodiment executes the writing data write-back process to perform the write-back process in which the writing data that is transmitted from the host computer 300 and that has been stored in the cache memory 112a is stored into the storage devices 120a to 120d and to generate and update the descriptor information upon writing of the writing data into the storage devices 120a to 120d. The writing data write-back process in FIG. 9 will now be described in accordance with the operation numbers in the flowchart.

In S21, the main control part 101 executes the write-back process to store the writing data that has been stored in the cache memory 112a and that has not been stored in the storage devices 120a to 120d in the storage devices 120a to 120d. For example, the writing cache that is stored in the readout cache area 112a35 in FIG. 8 is written back into the storage devices 120a to 120d.

In S22, the main control part 101 generates the descriptor information in which the write-back of the writing data is reflected upon write-back of the writing data in S21 and updates the descriptor information stored in the descriptor area in the cache memory 112a with the generated descriptor information. Specifically, the writing cache stored in the readout cache area 112a35 in FIG. 8 is stored in the storage devices 120a to 120d, as described above. In this case, as in the descriptor information at the address "5" in the descriptor table 112ad3 in FIG. 8, the descriptor information in which the transfer size is set to "4" (because the readout cache area 112a35 is a single non-successive writing cache area), the determination code is set to "0" (the readout cache (not to be backed up)), and the next address is set to "6" (the mapping address of the writing cache area 112a36, which the subsequent storage area) is generated and the generated descriptor information is set in the descriptor table 112ad3.

In S23, the main control part 101 updates the descriptor information if it is needed to change the descriptor information on the storage area next to the storage area the writing data in which is stored in the storage devices 120a to 120d upon generation of the descriptor information in S22. For example, all the data in part of the blocks in the writing cache areas, which is the same-type successive blocks, is stored in the storage devices 120a to 120d and the writing cache area is changed to the readout cache area. In this case, the multiple successive writing cache areas are separated or the type of the storage area of the beginning block is changed. As a result, the transfer size and/or the next address of the descriptor information in the writing cache area next to the readout cache area that is changed on the basis of the storage of the writing cache in the storage devices 120a to 120d may be changed. In such a case, the descriptor information generator 101a updates the descriptor information according to need. Specifically, as in the descriptor information at the address "6" in the descriptor table 112ad3 in FIG. 8, the descriptor information in which the transfer size is set to "4" (the size of the writing cache area 112a36 after the writing cache is stored), the determination code is set to "1" (the writing cache (to be backed up)), and the next address is set to "7" (the mapping address of the readout cache area 112a37, which the subsequent storage area) is generated and the generated descriptor information is set in the descriptor table 112ad3. Then, the writing data write-back process is terminated.

Although, after the writing data is written back in the storage devices 120a to 120d in S21, the descriptor information is generated in S22 and the descriptor information in the descriptor area is updated in S23 in the writing data write-back process of the present embodiment, the writing data write-back process is not limited to this. The writing data may be written back in the storage devices 120a to 120d after the generation and the update of the descriptor information are completed.

Figure 10:
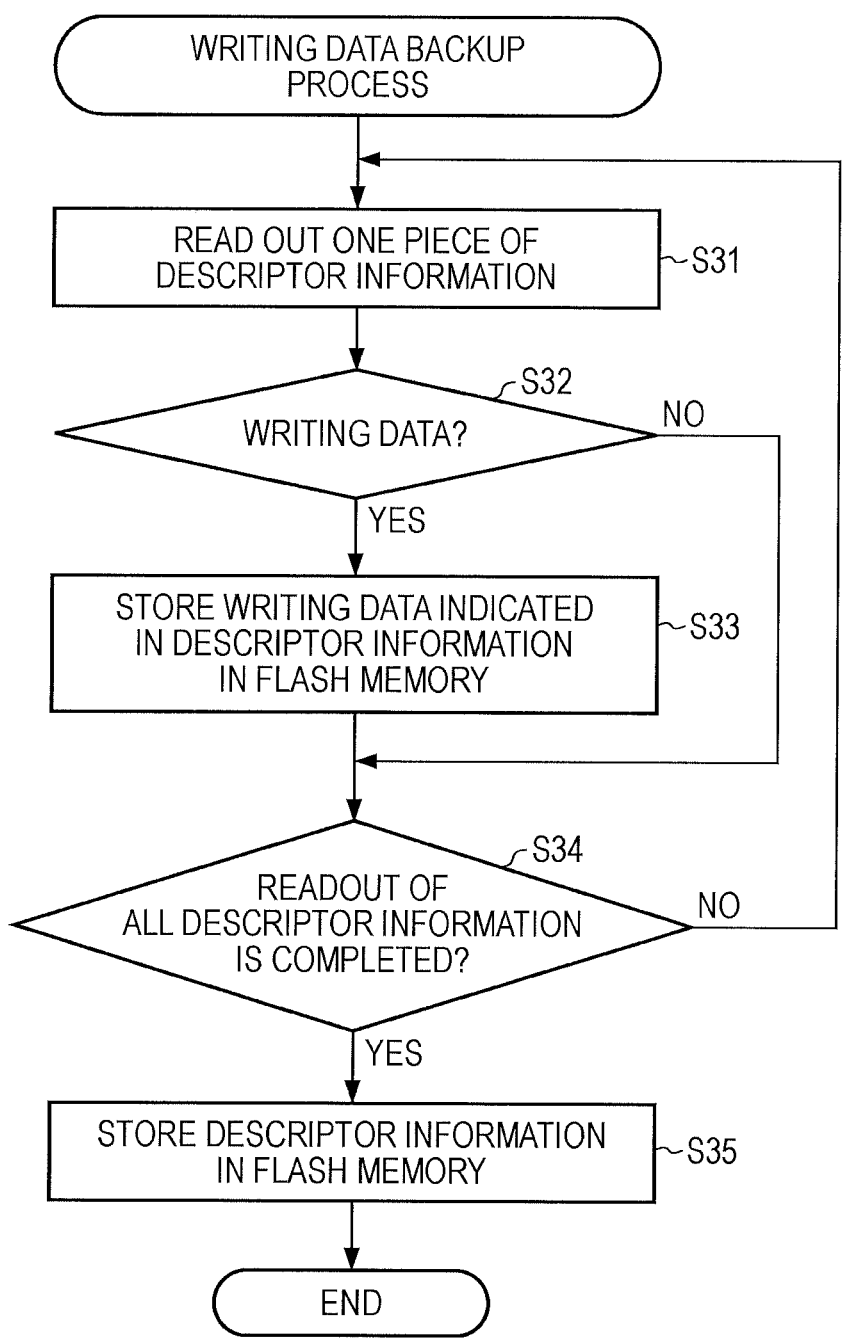
FIG. 10 is a flowchart illustrating an example of a writing data backup process according to the second embodiment.

FIG. 10 is a flowchart illustrating an example of a writing data backup process according to the second embodiment. The storage apparatus 100 of the present embodiment executes the writing data backup process to store the writing data that has not been written back, among the data stored in the cache memory 112a, in the flash memory 115a to back up the writing data at the time of power failure. The writing data backup process in FIG. 10 will now be described in accordance with the operation numbers in the flowchart.

In S31, the transfer controller 102 sequentially reads out one piece of the descriptor information stored in the cache memory 112a from the beginning.

In S32, the transfer controller 102 determines whether the descriptor information read out in S31 indicates the writing data. If the descriptor information indicates the writing data (YES in S32), the process goes to S33. If the descriptor information does not indicate the writing data (NO in S32), the process goes to S34.

In S33, the transfer controller 102 stores the writing data indicated in the descriptor information, which is determined to concern the writing data in S32, in the flash memory 115a.

In S34, the transfer controller 102 determines whether the descriptor information that is most recently read out in S31 is the last one and the readout of all the descriptor information stored in the cache memory 112a is completed. If the readout of all the descriptor information is completed (YES in S34), the process goes to S35. If the readout of all the descriptor information is not completed (NO in S34), the process goes back to S31.

In S35, the transfer controller 102 stores the descriptor information stored in the descriptor area in the cache memory 112a in the flash memory 115a. Then, the writing data backup process is terminated.

FIG. 11 is a sequence chart illustrating an exemplary operation to store the writing data in the cache memory according to the second embodiment. In the storage apparatus 100 of the present embodiment, the main control part 101 temporarily stores the writing data transmitted from the host computer 300 in the cache memory 112a, generates the descriptor information on the writing data, and performs the update by using the generated descriptor information. The storage of the transmitted writing data in the cache memory 112a and the generation and the update of the descriptor information will now be described in accordance with the sequence chart in FIG. 11.

In S111, the host computer 300 transmits the writing data to the storage apparatus 100. The main control part 101 supplies the writing data received by the storage apparatus 100 to the cache memory 112a.

In S112, the cache memory 112a stores the writing data transmitted in S111 under the control of the main control part 101. Upon completion of the storage of the received writing data in the cache memory 112a, the main control part 101 transmits a response indicating that the writing of the received writing data in the cache memory 112a is completed to the host computer 300.

In S113, the main control part 101 generates the descriptor information in which the storage of the writing data in the cache memory 112a is reflected upon completion of the storage of the writing data in the cache memory 112a in S112 and supplies the generated descriptor information to the cache memory 112a.

In S114, the cache memory 112a updates the descriptor information stored in the descriptor area with the descriptor information generated in S113 under the control of the main control part 101.

The update of the descriptor information in another storage area next to the writing cache area in the cache memory 112a in which the writing data is stored, based on the storage of the writing data in the cache memory 112a in S112, is performed by the main control part 101 in accordance with S14 in FIG. 7, although a description thereof is omitted in FIG. 11.

FIG. 12 is a sequence chart illustrating an exemplary operation to transmit the readout data to the host computer according to the second embodiment. In the storage apparatus 100 of the present embodiment, after the main control part 101 reads out the data stored in the storage devices 120a to 120d in response to a readout command transmitted from the host computer 300 and temporarily stores the readout data in the cache memory 112a, the main control part 101 transmits the readout data to the host computer 300, generates the descriptor information, and performs the update by using the generated descriptor information. The readout of the readout data from the storage devices 120a to 120d, requested from the host computer 300, the storage of the readout data in the cache memory 112a and the transmission of the readout data to the host computer 300, and the generation and the update of the descriptor information will now be described in accordance with the sequence chart in FIG. 12.

In S121, the host computer 300 transmits a readout command to request the storage apparatus 100 to read out the readout data and identify the readout data to the storage apparatus 100.

In S122, the storage devices 120a to 120d read out the readout data identified by the readout command received in S121 from the storage area in any of the storage devices 120a to 120d and supply the readout data to the cache memory 112a under the control of the main control part 101.

In S123, the cache memory 112a stores the readout data supplied in S122 under the control of the main control part 101.

In S124, the cache memory 112a transmits the readout data stored in S123 to the host computer 300 under the control of the main control part 101.

In S125, the main control part 101 generates the descriptor information in which the storage of the readout data in the cache memory 112a is reflected upon completion of the storage of the readout data in the cache memory 112a in S123 and supplies the generated descriptor information to the cache memory 112a.

In S126, the cache memory 112a updates the descriptor information stored in the descriptor area with the descriptor information generated in S125 under the control of the main control part 101.

The main control part 101 does not update the descriptor information in another storage area next to the readout cache area in the cache memory 112a from which the readout data is read out in S126 because the descriptor information in the other storage area is not to be backed up both before and after the readout. However, the processing in the main control part 101 is not limited to the above and the main control part 101 may update the descriptor information in another storage area next to the readout cache area from which the data is read out, as in the storage of the writing data in the cache memory 112a in FIG. 11.

FIG. 13 is a sequence chart illustrating an exemplary operation to write back the writing data in the storage devices according to the second embodiment. In the storage apparatus 100 of the present embodiment, the main control part 101 asynchronously stores the writing data that is transmitted from the host computer 300 and that is temporarily stored in the cache memory 112a in the storage devices 120a to 120d, generates the descriptor information on the writing data, and performs the update by using the generated descriptor information. The writing of the writing data stored in the cache memory 112a in the storage devices 120a to 120d and the generation and the update of the descriptor information will now be described in accordance with the sequence chart in FIG. 13.

In S131, the cache memory 112a supplies the writing data identified by the main control part 101, among the writing data stored in the cache memory 112a, to the storage devices 120a to 120d under the control of the main control part 101.

In S132, the storage devices 120a to 120d stores the writing data supplied from the cache memory 112a in their storage areas under the control of the main control part 101.

In S133, the main control part 101 generates the descriptor information in which the writing of the writing data in the storage devices 120a to 120d is reflected upon writing of the writing data in the storage devices 120a to 120d in S132 and supplies the generated descriptor information to the cache memory 112a.

In S134, the cache memory 112a updates the descriptor information stored in the descriptor area with the descriptor information generated in S133 under the control of the main control part 101.

The update of the descriptor information in another storage area next to the readout cache area in the cache memory 112a from which the writing data is read out, based on the writing of the writing data in the storage devices 120a to 120d in S132, is performed by the main control part 101 in accordance with S23 in FIG. 9, although a description thereof is omitted in FIG. 13.

FIG. 14 is a sequence chart illustrating an exemplary operation to back up the writing data in the flash memory according to the second embodiment. In the storage apparatus 100 of the present embodiment, at the time of power failure, the main control part 101 notifies the transfer controller 102 of the occurrence of power failure and the initial address of the descriptor area in which the descriptor information is stored in the cache memory 112a. Upon notification of the occurrence of power failure and the descriptor area, the transfer controller 102 reads out the descriptor information from the cache memory 112a and writes the writing data into the non-volatile storage areas 115a1 and 115a2 in the flash memory 115a to back up the writing data. The notification of an occurrence of power failure and the initial address of the descriptor area and the backup of the writing data will now be described in accordance with the sequence chart in FIG. 14.

In S141, the main control part 101 acquires the initial address of the descriptor area from the cache memory 112a and notifies the transfer controller 102 of an occurrence of power failure and the acquired initial address of the descriptor area.

In S142, the transfer controller 102 reads out one piece of descriptor information from the descriptor area in the cache memory 112a. When the transfer controller 102 reads out the descriptor information first after receiving the notification of an occurrence power failure, the transfer controller 102 reads out the descriptor information stored in the storage area in the cache memory 112a, indicated by the initial address of the descriptor area notified with the occurrence of power failure. In contrast, when the transfer controller 102 subsequently reads out the descriptor information, the transfer controller 102 reads out the descriptor information stored in the storage area in the cache memory 112a, indicated by the next address in the last descriptor information that is read out.

If the data (the writing data or the readout data) indicated by the descriptor information read out in S142 is the writing data to be backed up, in S143, the transfer controller 102 reads out the writing data from the cache memory 112a. If the data indicated by the descriptor information read out in S142 is the readout data not to be backed up, the transfer controller 102 does not read out the readout data from the cache memory 112a because the backup is not performed for the readout data.

In S144, the transfer controller 102 supplies the writing data to the non-volatile storage areas 115a1 and 115a2 if the writing data is read out in S143.

In S145a, the non-volatile storage area 115a1 stores the writing data supplied from the transfer controller 102 in S144 under the control of the transfer controller 102.

In S145b, the non-volatile storage area 115a2 stores the writing data supplied from the transfer controller 102 in S144 under the control of the transfer controller 102, as in S145a.

In S146, the transfer controller 102 supplies the descriptor information corresponding to the writing data stored in the respective storage areas to the non-volatile storage areas 115a1 and 115a2 if the saving of all the writing data is completed.

In S147a, the non-volatile storage area 115a1 stores the descriptor information supplied from the transfer controller 102 in S146 under the control of the transfer controller 102.

In S147b, the non-volatile storage area 115a2 stores the descriptor information supplied from the transfer controller 102 in S146 under the control of the transfer controller 102, as in S147a.

The writing data that has been stored in the cache memory 112a and that has not been stored in the storage devices 120a to 120d is saved in the flash memory 115a in S145a and S145b.

The flash memory 115a of the present embodiment includes the non-volatile storage areas 115a1 and 115a2. The transfer controller 102 of the present embodiment divides the multiple pieces of writing data stored in the cache memory 112a into two groups in the saving of the writing data in the cache memory 112a. The transfer controller 102 stores one of the two groups in the non-volatile storage area 115a1 and stores the remaining group in the non-volatile storage area 115a2 concurrently with the writing into the non-volatile storage area 115a2. Accordingly, it is possible to reduce the time needed for saving the writing data in the flash memory 115a.

S142 to S145a and S145b are repeated until the saving of the writing data that has been stored in the cache memory 112a and that has not been stored in the storage devices 120a to 120d in the non-volatile storage areas 115a1 and 115a2 is completed.

Although the transfer controller 102 supplies the descriptor information corresponding to the writing data stored in the respective storage areas to the non-volatile storage areas 115a1 and 115a2 where the descriptor information is stored in S146, the processing in transfer controller 102 is not limited to this. The transfer controller 102 may supply all the descriptor information including the descriptor information corresponding to the writing data stored in the non-volatile storage areas 115a1 and 115a2 to the non-volatile storage areas 115a1 and 115a2 where all the descriptor information may be stored. Alternatively, the transfer controller 102 may supply all the descriptor information to either of the non-volatile storage areas 115a1 and 115a2 where all the descriptor information may be stored.

As described above, since the storage apparatus 100 of the second embodiment generates the descriptor information indicating the storage state of the data in the cache memory 112a, it is possible to speed up the backup process of the data temporarily stored in the cache memory 112a to reduce the time needed for the backup process. Accordingly, it is possible to suppress an occurrence of a state in which the saving of the data in the cache memory 112a in the flash memory 115a is not completed owing to shortage of power accumulated in the SCU 116.

Since the determination code in the descriptor information is used to indicate whether the data stored in the cache memory 112a is to be backed up and the data to be backed up is transferred on the basis of the descriptor information at transfer, it is possible to reduce the time needed for the transfer process.

When the writing data transmitted from the host computer 300 is stored in the cache memory 112a, the descriptor information is generated such that it is indicated that the data is to be backed up. Accordingly, it is possible to reflect the latest state of the cache memory 112a in the descriptor information when the data to be backed up occurs.

When the writing of the writing data transmitted from the host computer 300 in the storage devices 120a to 120d is completed, the writing data is excluded from the backup target in the descriptor information. Accordingly, it is possible to prevent unnecessary data from being backed up, thereby suppressing an increase in the time needed for the backup process.

Since the descriptor information is stored in the cache memory 112a and the descriptor information is transferred to the flash memory 115a and is backed up along with the writing cache when the supply of power is stopped, it is possible to improve the efficiency of the backup process and the restoration process of the writing cache.

Since the descriptor information on the data not to be backed up indicates that the data is not to be backed up, the transfer of the data not to be backed up is omitted and an increase in the time needed for the backup process is suppressed.

The use of the flash memory 115a, which is a non-volatile memory, as the destination of the backup allows the writing cache to be held even after the supply of power from the SCU 116a is stopped.

The supply of sufficient power to the memory in which the data is to be backed up until the restoration allows the writing cache to be held until the restoration with no non-volatile memory used.

Since the cache memory 112a temporarily stores the data to be read out from and written into the storage devices 120a to 120d until the readout and the writing is completed, the content of storage may dynamically varied. Accordingly, accurately managing the latest status of the cache memory 112a by using the descriptor information allows the efficiency of the backup process to be improved.

Since the descriptor information on writing data is generated upon reception of an instruction to write the writing data from the host computer 300, it is possible to reflect the latest state of the cache memory 112a in the descriptor information.

Since the address of the descriptor information is associated with the location where the data is stored in the cache memory 112a, it is possible to simplify the descriptor information and to improve the efficiency of the process of generating the descriptor information, the backup process, and the restoration process.

Since, in storage of data in the cache memory 112a, the location where the data is stored is determined on the basis of the size of the data to be stored and the free space in the cache memory 112a, it is possible to prevent the data from being damaged owing to incorrect overwriting in the storage area in the cache memory 112a.

The storage of the descriptor information on data to be stored in the cache memory 112a in the storage location in the descriptor table 112ad1 associated with the location where the data is stored in the storage area in the cache memory 112a allows the efficiency of the process of generating the descriptor information, the backup process, and the restoration process to be improved.

Since the next address is used to indicate the initial address of the storage area next to the storage area of certain data, it is possible to improve the efficiency of the process of generating the descriptor information and the backup process.

Since the flash memory 115a includes the non-volatile storage areas 115a1 and 115a2, it is possible to concurrently perform the backup process to the non-volatile storage areas 115a1 and 115a2, thereby reducing the time needed for the backup process.

Even when the supply of power to the control unit 110a is stopped, the transfer controller 102 receives supply of power from the SCU 116a to back up the writing cache stored in the cache memory 112a.

Although the storage apparatus, the control unit, and the method of controlling the storage apparatus are described with reference to the drawings in the above embodiments, the configuration of each component may be replaced with an arbitrary configuration having a similar function. In addition, another arbitrary component or process may be added to the disclosed technology. Furthermore, arbitrary two or more configurations in the above embodiments may be combined to realize the disclosed technology.

The above description indicates only the principle of the technology. Those skilled in the art will recognize that various changes and modifications may be made to the technology. It will be further recognized and understood that the disclosed technology is not restricted to the configuration and applications described above and that all modifications and equivalents are made in the technology and the appended claims are intended to cover all such modifications and equivalents which may fall within the spirit and scope of the technology.

According to the storage apparatus, the control unit, and the method of controlling the storage apparatus, it is possible to speed up the backup process of data to reduce the time needed for the backup process.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A storage apparatus comprising:
a storage medium configured to store data; and
a control unit configured to control access to the storage medium, wherein the control unit includes:
  a first storage configured to store data to be stored in the storage medium;
  a second storage configured to store data;
  a control information generator configured to generate control information indicating a storage state of the data in the first storage; and
  a transfer controller configured to control transfer of the data stored in the first storage to the second storage based on control information generated by the control information generator when a supply of power to the control unit is stopped, wherein
the control information generated indicates whether each piece of data stored in the first storage is to be transferred, a position where each piece of data is stored in the first storage, and a size of each piece of data at transfer,
the first storage stores the control information, and the transfer controller is configured to control transfer of the control information in the first storage to the second storage when the supply of power to the control unit is stopped,
the first storage is a cache memory and the second storage is a flash memory,
the cache memory has a plurality of storage areas each having a same storage capacity,
the plurality of storage areas include a writing cache area and a readout cache area,
the writing cache area is a storage area, in the cache memory, in which a writing cache is partially or wholly stored and a readout cache is stored in a remaining part of the writing cache area when the writing cache is partially stored in the writing cache area,
the writing cache includes writing data, received from a host computer, that has not been stored in the storage medium,
the readout cache includes readout data read from the storage medium and writing data received from the host computer, that has been stored in the storage medium,
the readout cache area is a storage area, in the cache memory, in which only the readout cache is stored,
wherein
the control information includes determination information to determine whether each of the plurality of storage areas is the writing cache area, and
the transfer controller transfers all data stored in the determined writing cache area to the flash memory when determining that a storage area in the cache memory is the writing cache area based on the determination information.

* * * * *